United States Patent [19]

Ueno et al.

[11] Patent Number: 5,596,426
[45] Date of Patent: Jan. 21, 1997

[54] IMAGE PROCESSING METHOD AND APPARATUS

[75] Inventors: Fumihiro Ueno, Yokohama; Akira Torisawa, Machida; Yasuo Ito, Inagi; Eihiro Sakaki, Chofu; Masaki Ohtake, Kawasaki; Hiromi Kataoka, Yokohama; Atsushi Kashihara, Hachioji; Kaoru Seto, Chigasaki, all of Japan

[73] Assignee: Canon Kabushiki Kaisha, Tokyo, Japan

[21] Appl. No.: 479,466

[22] Filed: Jun. 7, 1995

Related U.S. Application Data

[63] Continuation of Ser. No. 263,408, Jun. 21, 1994, abandoned, which is a continuation of Ser. No. 139,050, Oct. 21, 1993, abandoned, which is a continuation of Ser. No. 675,278, Mar. 26, 1991, abandoned.

[30] Foreign Application Priority Data

| Mar. 30, 1990 | [JP] | Japan | 2-086164 |
| Jul. 26, 1990 | [JP] | Japan | 2-199480 |

[51] Int. Cl.⁶ .................................................. H04N 1/46
[52] U.S. Cl. .......................... 358/500; 358/443; 358/524
[58] Field of Search .................................. 358/500–501, 358/522–524, 534, 536, 404, 443–445, 474

[56] References Cited

U.S. PATENT DOCUMENTS

| 4,395,740 | 7/1983 | Yuen et al. | 360/72.2 |
| 4,713,684 | 12/1987 | Kawamura et al. | 358/78 |
| 4,776,025 | 10/1988 | Hosoda | 348/714 |
| 4,851,927 | 7/1989 | Moriya | 358/300 |
| 4,891,690 | 1/1990 | Hasegawa et al. | 358/75 |
| 4,926,252 | 5/1990 | Nagano | 358/75 |
| 4,942,479 | 7/1990 | Kanno | 358/444 |

FOREIGN PATENT DOCUMENTS

| 0081375 | 6/1983 | European Pat. Off. . |
| 2139451 | 11/1984 | United Kingdom . |

OTHER PUBLICATIONS

Patent Abstracts of Japan, vol. 14, No. 217 (May 1990) for Japanese Kokai 50852/1990.
Patent Abstracts of Japan, vol. 3, No. 512 (Nov. 1989) for Japanese Kokai 206051/1989.

*Primary Examiner*—Leo Boudreau
*Assistant Examiner*—Kinfe-Michael Negash
*Attorney, Agent, or Firm*—Fitzpatrick, Cella, Harper & Scinto

[57] ABSTRACT

This disclosure relates to an image forming and processing apparatus having a plurality of storage devices capable of forming an image at a high speed by reading image data in parallel. Since a predetermined quantity of image data is stored in a plurality of hard discs, and the image data is read from the hard discs to a double buffer in parallel, an image can be formed continuously at a high speed. Another structure is arranged in a manner such that images are stored in hard discs of an optional number and the images are transmitted to a printer engine by using a FIFO (First In First Out) buffer which corresponds to the hard discs. Therefore, an image can be transmitted continuously at a high speed asynchronously with the printer output.

31 Claims, 29 Drawing Sheets

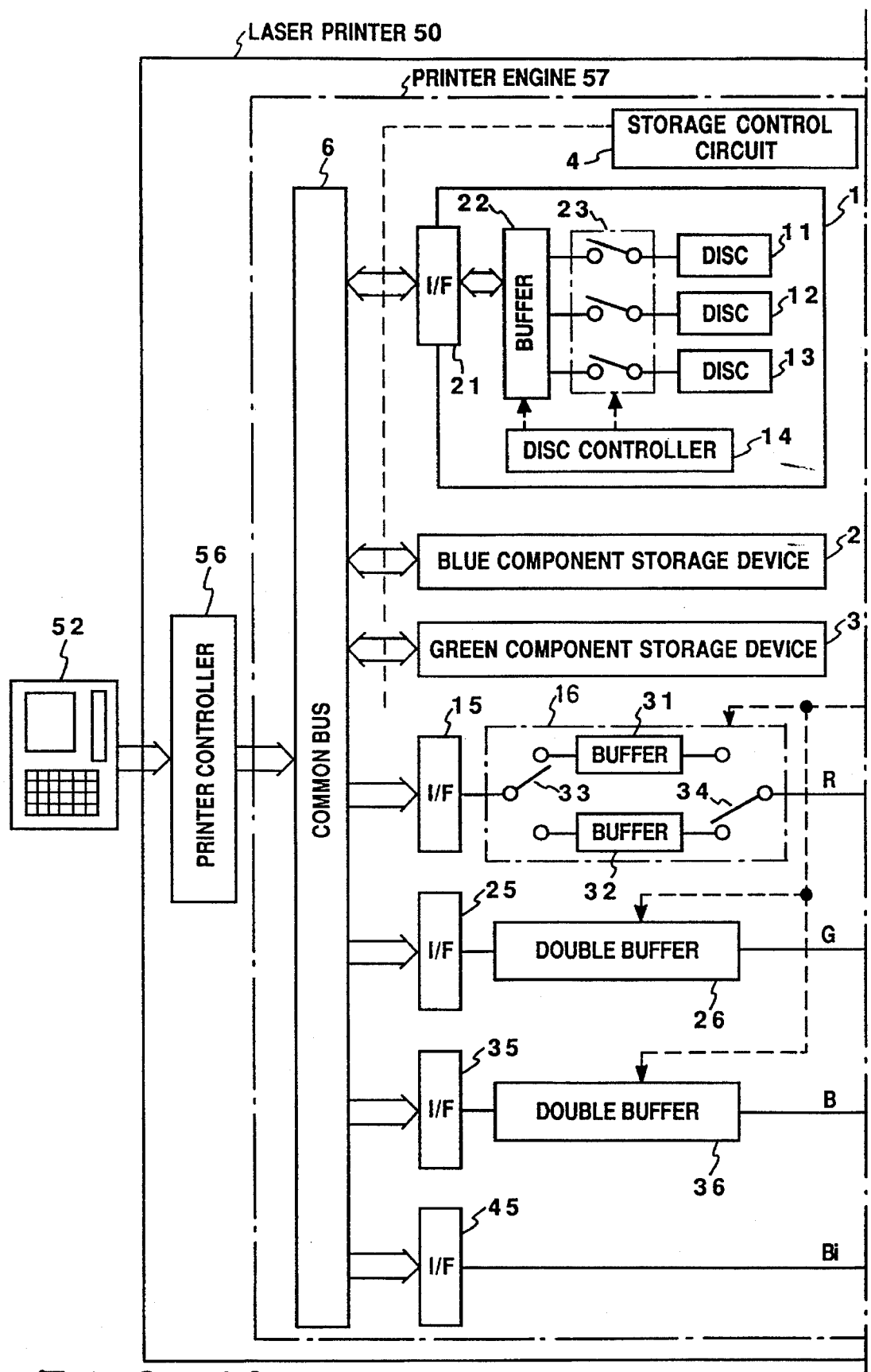
F I G. 1A

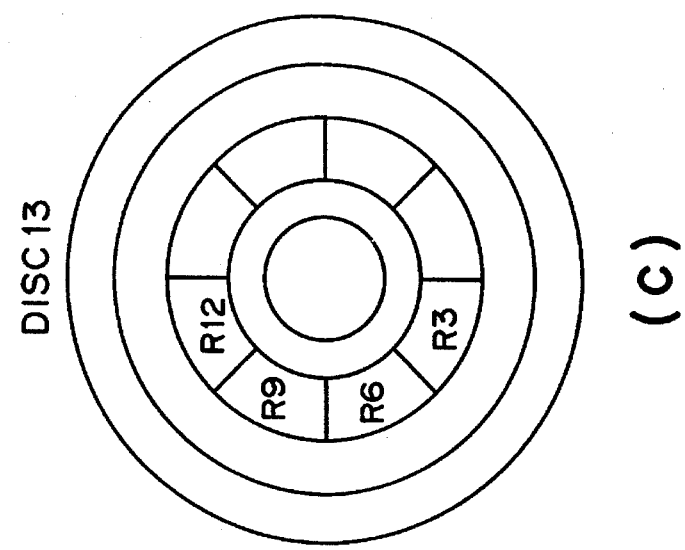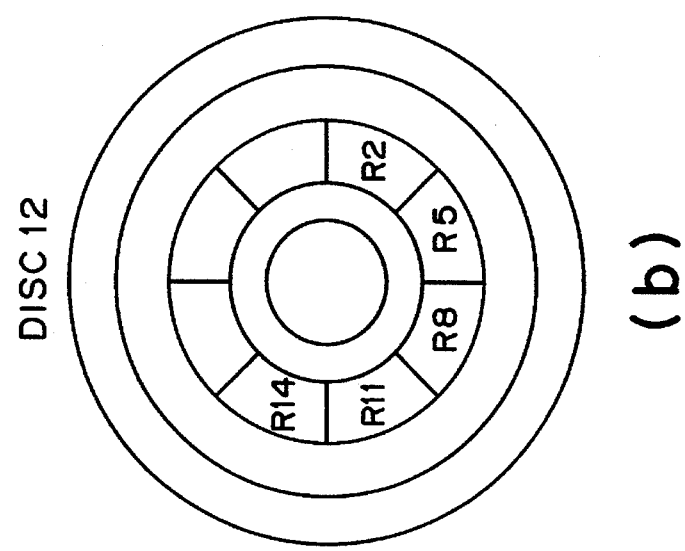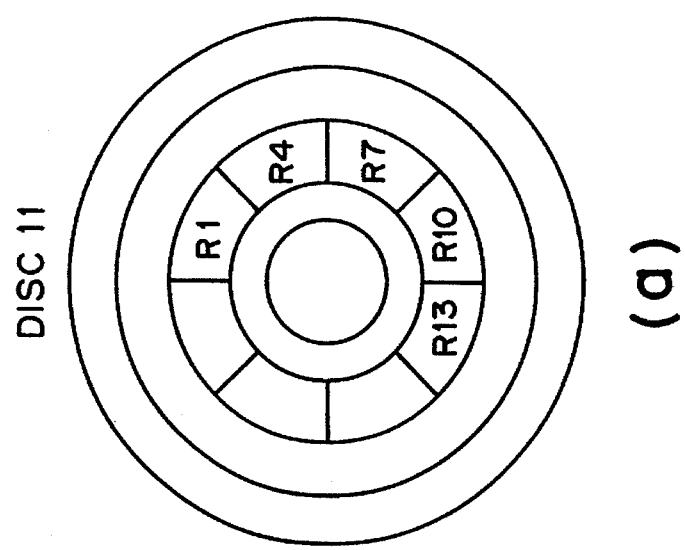
FIG. 2

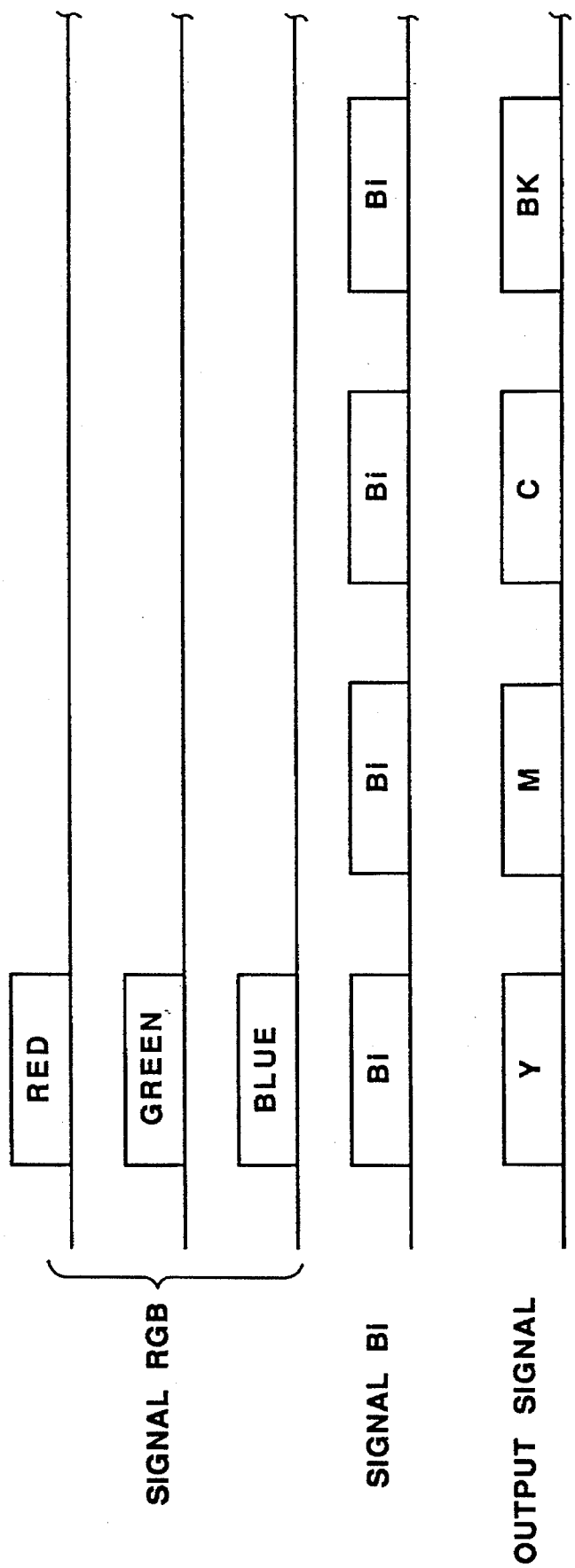

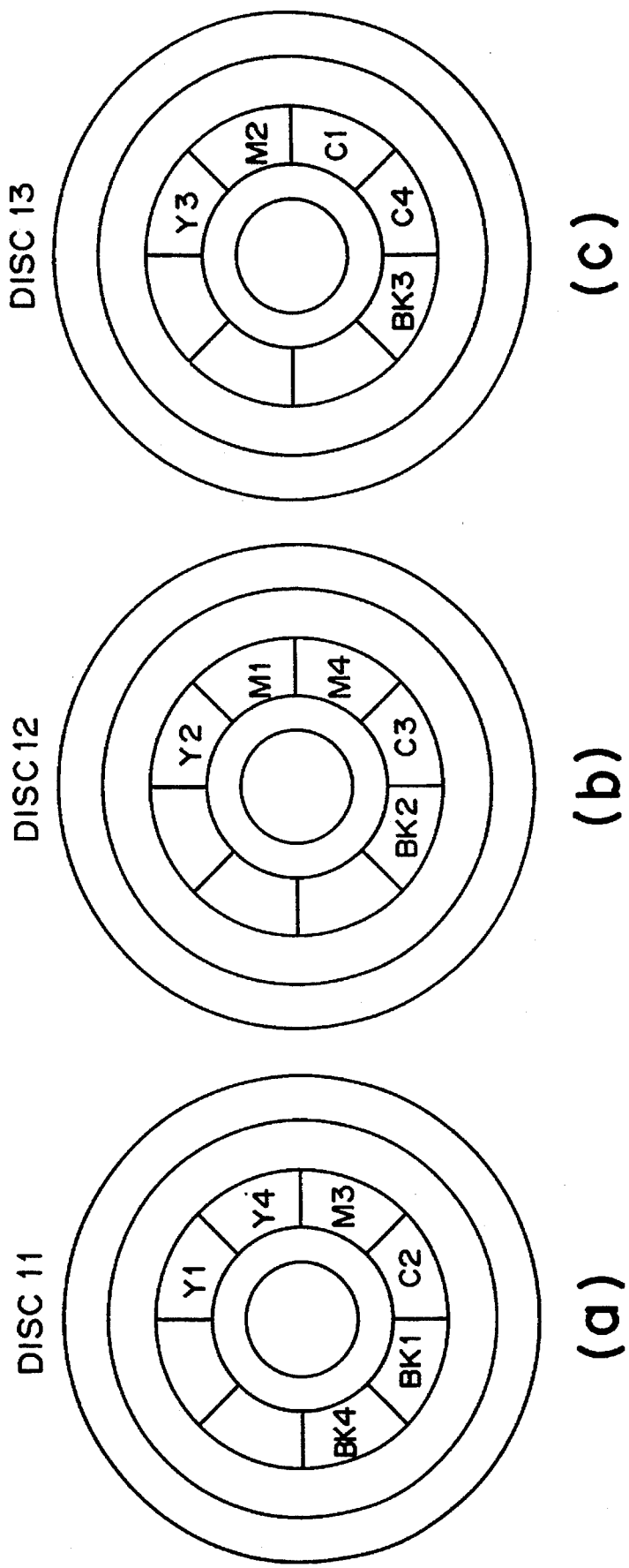
F I G. 9

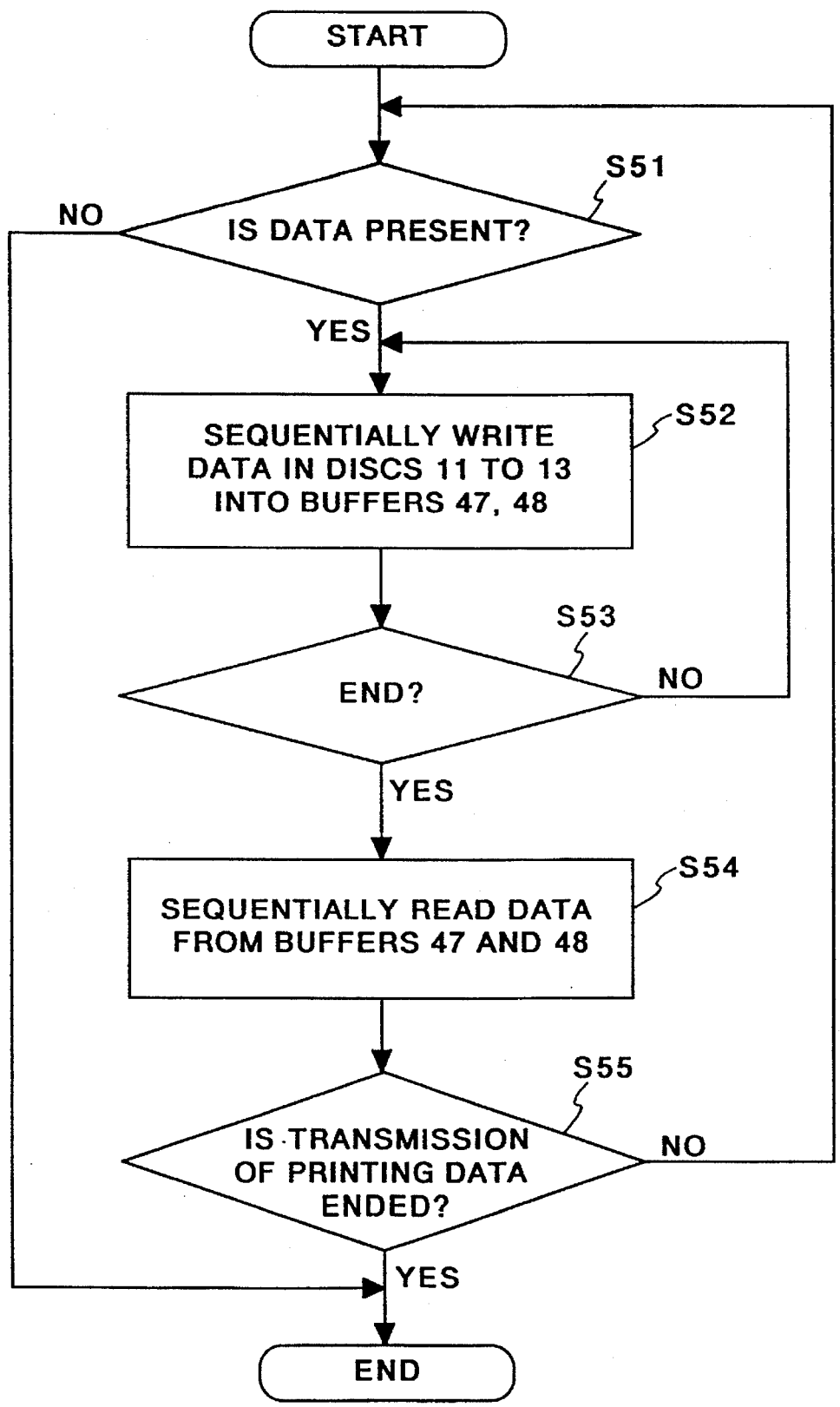
F I G. 11

IMAGE PROCESSING METHOD AND APPARATUS

This application is a continuation of application Ser. No. 08/263,408 filed Jun. 21, 1994, which is a continuation of application Ser. No. 08/139,050 filed Oct. 21, 1993, which is a continuation of application Ser. No. 07/675,278 filed Mar. 26, 1991, each of which is now abandoned.

BACKGROUND OF THE INVENTION

1. FIELD OF INVENTION

This invention relates to an image processing method and apparatus, and, more particularly, to an image processing apparatus, for example, a laser printer, an LED printer, or the like, for forming images of a plurality of colors based on image signals transmitted from the host computer and so on, and, for example, a printer apparatus for controlling image data by storing it in an auxiliary disc storage device or the like.

2. THE PRIOR ART

A multi-color recording apparatus has until now been widely used as an output apparatus of a computer system. A typical laser beam printer shown in FIG. 21 comprises a printer engine 57 for recording an image by using a photosensitive drum (not shown) in accordance with dot data and a printer controller 56 arranged in a manner such that it receives code data supplied from an external host computer 52, generates page information consisting of dot data in accordance with the supplied code data, and successively transmits the dot data to printer engine 57. Host computer 52 selects and loads application software from a storage device, such as a floppy disc, which stores various kinds of application software, so as to start the program in the application software. Host computer 52 then performs a color image process by using the above-described application software to generate multi-color information, or to store the information.

FIG. 22 is a timing chart which illustrates a transferring sequence of signal processing circuits 58 through 62 of printer engine 57.

The dot data supplied from printer controller 56 are transferred to a color conversion processing circuit 58 in the form of color image signals, signals R (red), G (green) and B (blue). The transferred signals R, G and B are converted by color conversion processing circuit 58 into color image signals for printing, that is, signals M (magenta), C (cyan) and Y (yellow). A Bk (black) generating circuit 60 extracts a Bk signal from the above-described signals Y, M and C. A masking processing circuit 59 subjects the signals Y, M and C to a variety of signal processing including a masking process. Signals Y, M, C and Bk, which are the outputs from masking processing circuit 59 and Bk processing circuit 60 are stored in memory 61 so as to be sequentially transmitted to OR gate 63 by switching control circuit 62. Output 65 from OR gate 63 is subjected to a binarization processing such as dithering by binarization circuit 66 and is transmitted to a laser driver disposed in printing unit 67.

Image signals denoting characters to be formed by combinations of principle toner colors or the signals Y, M, C and Bk transferred from host computer 2 are received in the form of signals Bi. The signals Bi are supplied to OR gate 63 so as to be synthesized with the signals Y, M, C and Bk which have been switched through switching control circuit 62. As a result, the synthesized signals are transmitted to the laser driver.

Recently, the use of page printers typified by a laser beam printer has rapidly increased because they have been superior to conventional dot matrix type serial printers in terms of image quality, output speed and silence in operation. A page printer of this type comprises an image forming controller for creating bit map image data (to be abbreviated to "image data" hereinafter) for one page from printing data for a text or an image transmitted from a host computer or the like, and a printer engine for exposing the image data transmitted from the image forming controller to a photosensitive body so as to print it in accordance with a sequence including the toner development, transfer to paper and fixing of the image.

In recent years, the printing data transmitted from the host computer has been mainly expressed by PDL a (Page Description Language) such as Post Script ®. Therefore, the hardware of the image forming controller usually comprises a high speed microprocessor and an image memory (RAM) which stores image data of one page. For example, a binary (white and black) printer engine capable of printing an image on a printing paper sheet, size A4 (296 mm ×210 mm) conforming to JIS (Japan Industrial Standard), at a dot density of 300 dpi (dots per inch), requires an image memory having a capacity of about 1 megabyte.

The capacity of the image memory inevitably increases excessively when the spatial resolution of the formed image is improved, multi-valued data is used, and a full color image is formed. In such a case, the size of the memory for the paper size is A4 is described below. A binary printer capable of printing an image at a dot density of 600 dpi requires a memory the capacity of which is about 4 megabytes, a multiple-value (8-bits, that is, 256 gradations or steps) printer requires a memory the capacity of which is about 8 megabytes, and a 300 dpi full color (each of color components Y, M, C and Bk represented as 8-bit data) printer requires memory the capacity of which is about 32 megabytes.

As shown in FIG. 22, if memory 61 for storing data for four color components is not provided, signals R, G and B for the same image must be supplied three times from host computer 52 or printer controller 56 so as to sequentially generate signals Y, M and C. As a consequence, host computer 52 cannot perform ensuing processes during the time in which signals R, G and B are being transmitted, causing the total throughput to be lowered. However, since host computer 52 must hold the signals R, G and B until three repetitions of the outputs of the signals R, G and B are completed, the load of host computer 52 becomes too great.

A large memory of about 24 megabytes is required in order to hold signals R, G and B using a semiconductor memory in a case where the printer paper size is A4, the spatial resolution is 300 dpi and the gradation is 256 steps for each color. As a consequence, the overall cost cannot be reduced.

Accordingly, in order to reduce the overall cost while using a large capacity memory, the following two countermeasures have been taken:

(1) Employ an external storage unit such as a hard disc, yielding a reduced cost and a large capacity for image memory; or (2) Reduce the memory size by making use of an image data compression technique.

However, when A4 paper sheets are printed at a speed of 8 sheets/minute at a spatial resolution of 300 dpi, image signals must be read at 1.5 megabyte/second so as to be stably supplied to the laser diode or the like in a case where an auxiliary storage unit such as a hard disc is used for the purpose of holding the signals R, G and B. Usually, Since the auxiliary storage unit is capable of reading data at a speed of about 700 to 800K byte, second data cannot be printed precisely at high speed if the auxiliary storage unit is used in accordance with the above-described conventional method.

If an external storage unit such as the hard disc is used as an image memory in place of a semiconductor memory such as a DRAM, the cost of the memory can be reduced by a factor of between 20 and 100. However, since hard discs or the photoelectromagnetic discs store data on each track (usually, one track is able to store data of 8K to 20K bytes),it takes 5 to 15 msec, which is very long, for the head to be moved to the track (to seek the track) from which desired data is to be read or to which desired data is to be written. Even worse, the data transferring speed within a track has been the unsatisfactory speed of 5 to 10 megabyte/sec. Therefore, a critical technical problem arises in using a hard disc or a photoelectromagnetic disc in place of a image memory of the page printer. Another problem arises when an external storage unit is used as the image memory in a manner such that a microprocessor in the image forming controller operates it; a virtual memory control is necessary. Therefore, the structure of the image forming controller becomes too complicated.

In a case where the size of the memory is reduced by employing an image compression technique, it takes an excessively long time to compress the image data as well as to reexpand the data read from the image memory so as to obtain image data of complete bit map when novel image data is generated by recursively utilizing the image data which has been temporarily stored in the image memory, as well as the image data is printed out with Post Script ® like processing. When the compression and the expansion are performed by means of hardware, another problem arises in that a control circuit, the structure of which is quite complicated, must be used.

SUMMARY OF THE INVENTION

Accordingly, it is a purpose of the present invention to provide an image processing apparatus capable of forming an image at a high speed.

According to the present invention, the foregoing object is attained by providing an image processing apparatus comprising: a plurality of storage means having a recording medium for storing image signals, and read means for simultaneously reading the image signals from the plurality of storage means.

Therefore, according to the present invention, the image signals are stored in the plurality of storage means after the image signals have been divided into predetermined quantities so as to be read and transmitted from the plurality of storage means in parallel. Consequently, the image signal can be transmitted at a speed higher than a reading speed of one storage means.

It is another purpose of the present invention to provide an image processing apparatus capable of operating significantly independently from external equipment, and capable of forming an image at a high speed.

According to the present invention, the foregoing object is attained by providing an image processing apparatus comprising: input means for inputting image signals supplied from an external; a plurality of storage means for storing the image signals input by the input means; control means for performing a control operation in a manner such that the image signals are read from the plurality of storage means in parallel; and output means for outputting the image signals which have been read in parallel by the control means.

Since the image processing apparatus according to the present invention has a plurality of storage means for storing the image signals and control means for reading the image signals from the plurality of storage means in parallel, the following effects can be obtained:

(1) Since transmission of an external image signal from external apparatus such as, for example, a host computer or a printer controller, and the process of forming an image by the image processing apparatus can be independently performed, the loads of the host computer and the printer controller can be reduced.

(2) Since transmission of an external image signal, for example, a host computer or a printer controller, and the process of forming an image by an image processing apparatus can be independently performed, the degree of freedom in the transmission of the image signal can be increased. In consequence, both a serial signal and a parallel signal can be transmitted.

(3) The image signal can be read from the storage device at a high speed.

In consequence, the throughput of the process can be improved.

It is another purpose of the present invention to provide an image processing apparatus revealing independence from external equipment, capable of reducing a load of the image processing process and forming an image at a high speed.

According to the present invention, the foregoing object is attained by providing an image processing apparatus for receiving image signals supplied from an external apparatus, processing the image signals and outputting the processed image signals comprising: processing means for processing the received image signals; a plurality of storage means for storing the processed image signals by the processing means; control means for performing a control operation in a manner such that the processed image signals are read from the plurality of storage means in parallel; and output means for outputting the processed image signals which have been read by the control means in parallel.

According to the present invention, the received image signal is first processed before it is stored in the storage means. Therefore, the ensuing image forming operation can be simplified.

It is another purpose of the present invention to provide an image processing apparatus revealing a simple structure and reduced cost and, capable of processing an image at a high speed.

According to the present invention, the foregoing object is attained by providing an image processing apparatus for receiving code data supplied from an external, generating dotted image data based on the code data, and outputting the dotted image data, comprising: image data generating means for generating dotted image data based on the code data; and output means for transmitting the dotted image data to image forming means synchronously with a synchronizing signal from the image forming means; storage means for storing the dotted image data; buffering means for buffering the dotted image data read from the storage means; and control means for writing the dotted image data to the buffering means asynchronously with the synchronizing signal, reading the dotted image data from the buffering means in synchronization with the synchronizing signal, and transmitting an output to the output means.

Therefore, according to the present invention, the transference of data from the storage means to the buffering means and the transference of data from the buffering means to the image output means are asynchronously performed. This results in high speed data transfer, easy control, simplified hardware structure and a reduced cost.

Also, according to the present invention, if an external storage device, such as a hard disc, revealing a reduced cost and large capacity, is employed as the storage means of the image processing apparatus and the transference of the image data from the external storage device to the image output means is controlled by the control means via the buffering means at the time of transmitting the image, an image processing apparatus can be constituted while maintaining a high speed transference of the image data and reducing the overall cost.

The invention is particularly advantageous in view of cost reduction, since the cost of the image memory can be reduced to a small fraction in comparison to the cost of a semiconductor memory such as the DRAM.

It is another purpose of the present invention to provide an image processing apparatus revealing a reduced cost and capable of processing an image at a high speed.

According to the present invention, the foregoing object is attained by providing an image processing apparatus for receiving code data supplied from an external, generating image data based on the code data and outputting the image data, comprising: image data generating means for generating dotted image data based on the code data; and output means for transmitting the dotted image to image forming means synchronously with a synchronizing signal from the image forming means, wherein the image data generating means includes: a plurality of storage means for storing the dotted image data; a plurality of buffering means for buffering the dotted image data read from the plurality of storage means; and control means for performing its control operation in a manner such that the dotted image data is read from the plurality of storage means in parallel so as to transmit the dotted image data to the plurality of buffering means and the dotted image data is read from the plurality of buffering means so as to transmit an output to the output means.

According to the present invention, since the image processing apparatus has a plurality of storage means and a plurality of buffering means, the transferring speed of the image data can be increased by a degree corresponding to the number of employed hard discs when hard discs are employed as a storage means. As a consequence, the total throughput of the image output can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 1A and 1B are block diagram illustrating a laser printer according to a first embodiment of the present invention;

FIG. 2 which has parts (a), (b) and (c) illustrates storage areas of discs 11 to 13 in the storage device of the laser printer;

FIG. 3 is a timing chart showing the transferring sequence for image information in the laser printer;

FIG. 9 which has parts (a), (b) and (c), illustrates the storage areas of the discs 11 to 13;

FIG. 11 is a flow chart for operations of reading data from the discs 1 to 13 shown in FIG. 7;

DESCRIPTION OF THE PREFERRED EMBODIMENTS

Preferred embodiments of the present invention will now be described in detail in accordance with the accompanying drawings.

As described above, a laser printer apparatus, which is a typical image processing apparatus, comprises a printer controller for interacting with a host computer to which the image processing apparatus is connected, and a printer engine for transmitting data supplied from the host computer. The first two of four embodiments which will be described relate to the printer engine, while the rest of the embodiments relate to the printer controller.

[First Embodiment]

Figure 1B:
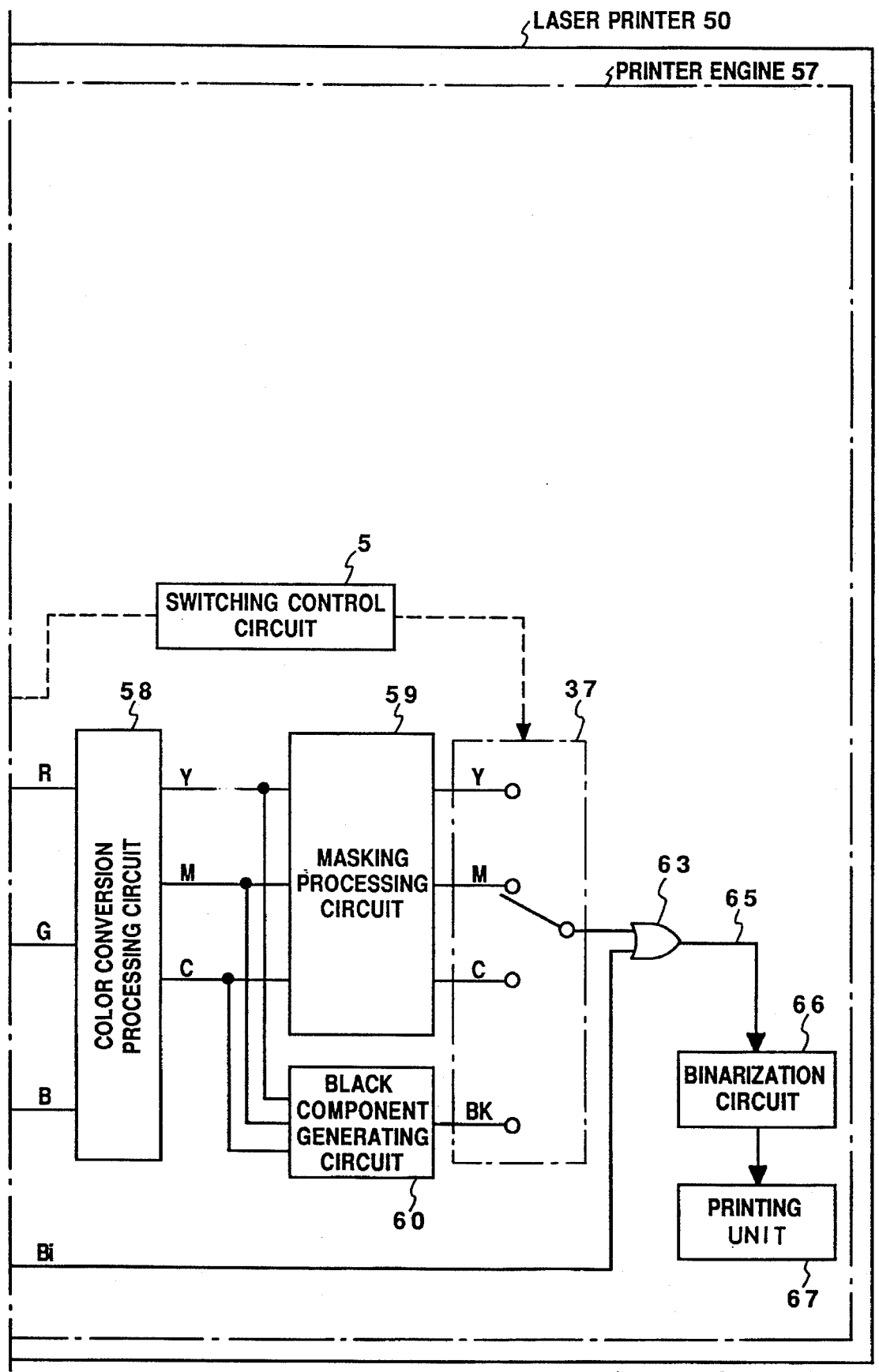

FIG. 1 is a block diagram illustrating the basic structure of laser printer 50 according to a first embodiment of the present invention. The laser printer 50 comprises printer controller 56 and printer engine 57. Referring to FIG. 1, reference numeral 1 represents a red-component storage unit, 2 represents a blue-component storage unit and 3 represents a green-component storage unit. Since the above-described three storage units 1 to 3 have the same structures, the inner structure of only the red-component storage unit 1 is illustrated in FIG. 1.

In laser printer 50, code data supplied from host computer 52 is converted into dotted image data by printer controller 56. Although printer controller 56 is integrated in laser printer 50, it may instead be integrated in host computer 52. Furthermore, signals R, G and B may be transmitted from printer controller 56 in any of surface (plane), line or dot sequential manner. The signals R, G and B supplied from printer controller 56 are stored in the above-described storage units for the corresponding colors via a common bus 6. According to this embodiment, hard discs are used to serve as storage units 1 to 3. Reference numeral 4 represents a storage control circuit for controlling the connection of the transmission path in a manner such that the signal R supplied from printer controller 56 is transmitted to storage unit 1 and the signal G is transmitted to storage unit 2 and the signal B is transmitted to storage unit 3.

This embodiment is characterized by each of storage units 1 to 3 having three discs. Namely, storage unit 1 comprises a buffer 22, a disc controller 14, a switch circuit 22 and discs 11 to 13. Thus, the signal R which has passed through common bus 6 is buffered by the buffer 22 through interface (I/F) 21 before it is stored in discs 11 to 13. Buffer 22 has a predetermined storage capacity, for example, a capacity capable of storing the signals R for one line of image data. Disc controller 14 controls a switching operation performed by switch circuit 23 so as to divide the signals R for one line stored in the buffer 22 into three portions. The divided signals R are written to the discs 11 to 13.

FIG. 2 illustrates the storage areas of the discs 11 to 13 in red-component storage unit 1. Referring to FIG. 2, symbols R1, R2, R3, . . . , Rn (n is a natural number) denote the signals R for ⅓ line. The i-th line (i=1, 2, 3, . . . ) is divided into three sections R ($3i-2$), R ($3i-1$) and R ($3i$) so as to be stored in discs 11 to 13. Similarly, the signals G and B are respectively stored in three discs each of blue-component storage unit 2 and green-component storage unit 3.

When the signals R are read out from discs 11 to 13, the signals R are simultaneously read out from three discs 11 to 13. Thus, the speed of reading out the signals for one line can be at most three times that in a case where the signals R for one line are read out from one disc. In blue-component storage unit 2 and green-component storage unit 3, writing and reading of the signals to/from their discs are performed similarly to red-component storage unit 1. As a result, the signals R, G and B are simultaneously transmitted from three storage units 1 to 3 to interfaces 15, 25 and 35.

Reference numeral 5 represents a switching control circuit for controlling buffering operations to double buffers 16, 26 and 36 to buffer the signals R, G and B transferred from the I/Fs 15, 25 and 35. Switching control circuit 5 further controls another switching operation performed by MPX (multiplexer) 37 to be described later.

Double buffers 16, 26 and 36 have the same structures such that double buffer 16 includes two buffers 31, 32 and two switches 33 and 34 so that it is able to simultaneously perform input and output operation. Switching control circuit 5 controls a switching operation performed by switches 33 and 34.

Reference numeral 58 represents a color conversion processing circuit for logarithmically converting the signals R, G and B from double buffers 16, 26 and 36 into printing color signals Y, M and C. Reference numeral 60 represents a black component generating circuit for generating a Bk signal from the signals Y, M and C transmitted from color conversion processing circuit 58. Reference numeral 59 represents a masking processing circuit for subjecting the signals Y, M and C to a UCR (Under Color Removal) process and to a masking process so that signals Y, M and C revealing excellent color reproduciblity are generated in accordance with the color image signal. MPX 37 sequentially selects one of the signals Y, M, C and Bk from masking processing circuit 59 and black component generating circuit 60 so as to deduce the selected signal to OR gate 63. OR gate 63 calculates the logical sum of the signals Y, M, C and Bk which have been subjected to the UCR process and the black component generating process and the signals Y, M, C and Bk transmitted from host computer 52 in the form of signals Bi, and then the logical sum is output by OR gate 63.

FIG. 3 illustrates a sequence for transferring the image information, where the axis of the abscissa stands for the time axis. As shown in FIG. 3, output signals Y, M, C and Bk are sequentially transmitted in response to an input of signals R, G and B from host computer 52 or printer controller 56. The output from OR gate 63 is subjected to a binarization process such as dithering by a binarization circuit 66 so as to be transmitted to a printing unit 67, thus resulting in forming an image. In a case where that the signals Y, M, C and Bk are themselves binary, binarization circuit 66 can be omitted from the structure.

The printing unit 67 forms an image in accordance with an electro-photographic method by employing, for example, a laser diode in a manner such that an image is formed in response to the signal Y before an image is formed in response to the signal M on the formed yellow image. Similarly, images are sequentially formed in response to the signals C and Bk so that a color image for one page is formed.

Figure 4A:
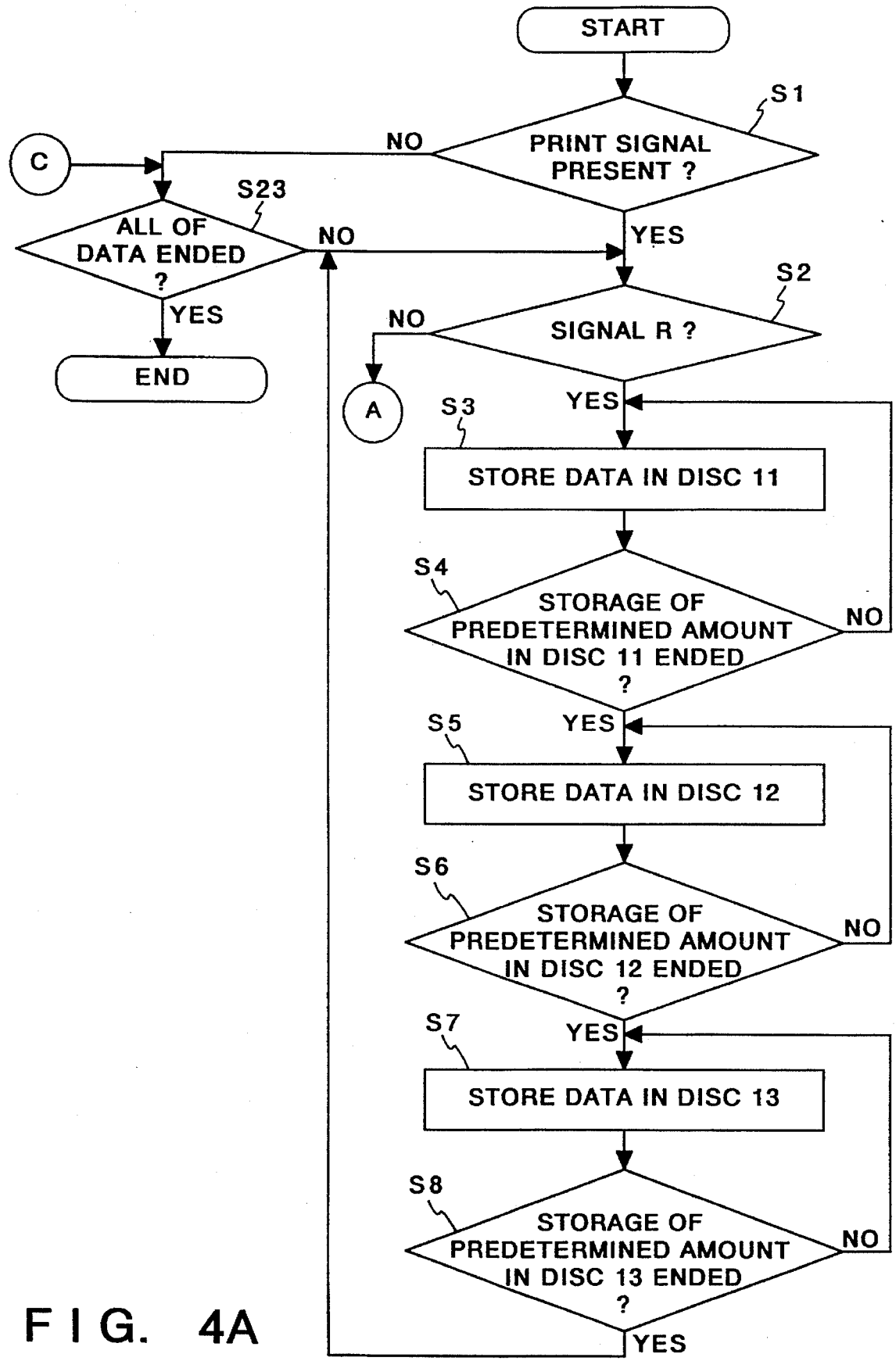
FIGS. 4A, 4B and 4C are flow charts showing the process performed in the storage control circuit of the laser printer.
Figure 4B:
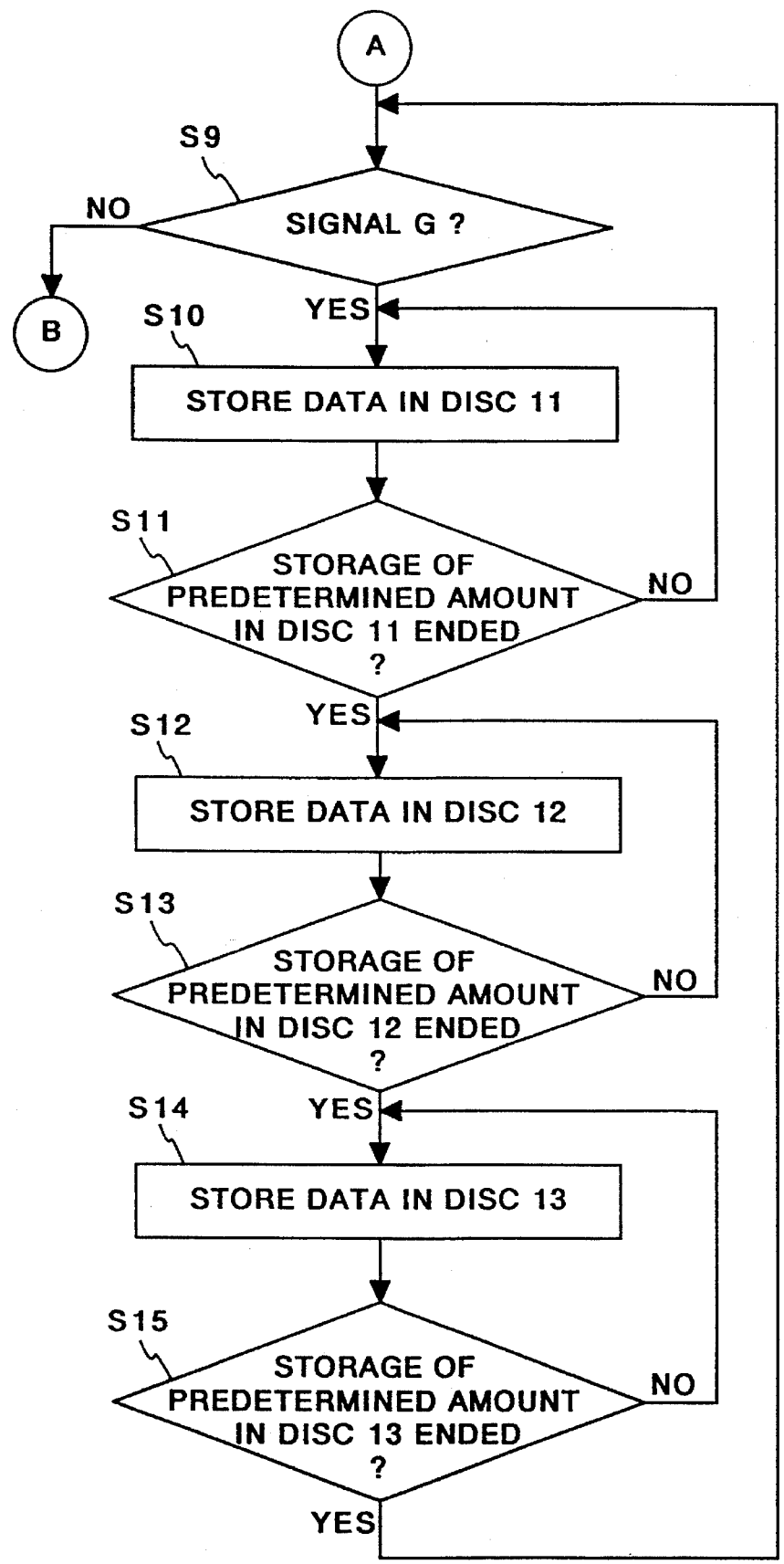
Figure 4C:
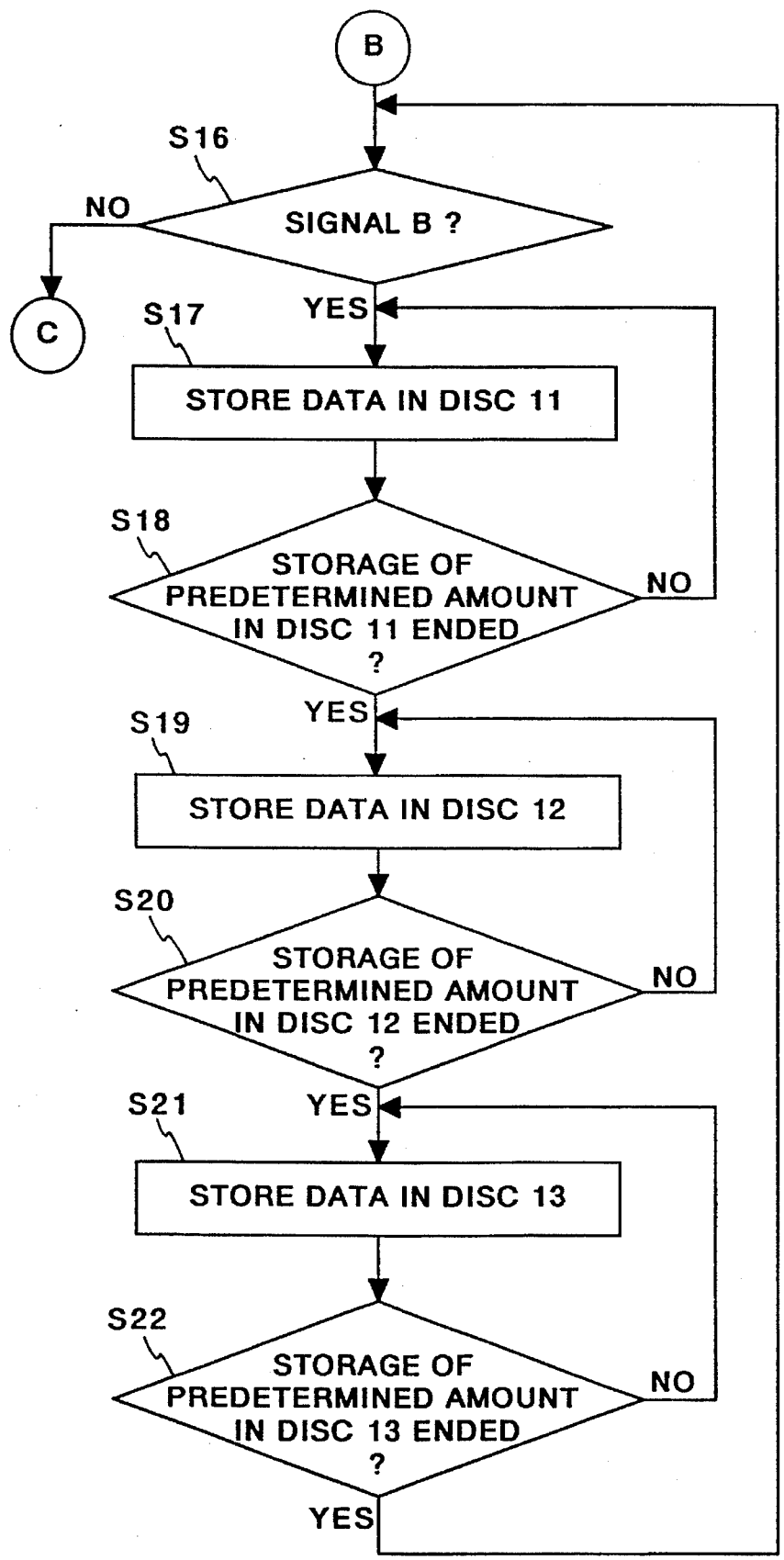

The operation of writing data to discs 11 to 13 will now be described with reference to FIG. 4 (consisting of FIGS. 4A, 4B and 4C), which is a flow chart showing an operation performed by storage control circuit 4.

(1) In step S1 existence of a printing signal is checked for. If it has been identified that no demand for a printing signal exists, the process proceeds to step S23 in which the process terminates. If it has been identified that the demand exists on the other hand, the process proceeds to step S2.

(2) In step S2, it is checked whether or not a demand for the signal R exists. If it has been identified that the demand exists, the process proceeds to step S3 in which the following operations (a) through (d) are performed. If it has been identified that the demand does not exist, the process proceeds to step S9.

(a) In step S3, the signal R (R ($3i-2$)) of a predetermined data amount is stored in disc 11 of red-component storage unit 1.

(b) In step S4, it is checked whether or not the storage of the signal R of the predetermined amount into disc 11 has been completed. If it is identified that the storage has not been completed, the process returns to step S3 in which the data storage is continued. If it is identified that the storage has been completed, the process proceeds to step S5.

(c) In steps S5 and S6, data is stored in disc 12 of red-component storage unit 1 until the data is stored by the predetermined amount.

(d) In steps S7 and S8, data is stored in disc 13 of red-component storage unit 1 until the data is stored by the predetermined amount. In step S8, it is checked whether or not the data has been stored by the predetermined amount. If it has been identified that the data has been stored by the predetermined amount, the process returns to step S2.

(3) In step S9, it is checked whether or not a demand for signal G exists. If it has been identified that the demand exists, the process proceeds to step S10. Then, the signal G is, in steps S10 to S15, subjected to similar processes to those performed on the signal R in steps S3 to S8. If it has been identified that the demand does not exist, the process proceeds to step S16.

(4) In step S16, it is checked whether or not a demand for signal B exists. If it has been identified that the demand exists, the process proceeds to step S17. Then, the signal B is, in steps S17 to S22, subjected to similar processes to those performed on the signal R in steps S3 to S8. If it has been identified that the demand does not exist, the process proceeds to step S23.

(5) In step S23, it is examined whether or not all of the data have been processed. If it is identified that all of the data have been processed, the process is ended. If it is identified that the the data processing has not been completed yet, the process returns to step S2.

After all of the signals R, G and B have been stored in storage units 1 to 3, switching control circuit 5 causes data to be sequentially read from storage units 1 to 3 to double buffers 16, 26 and 36 so as to be converted into the signals Y, M, C and Bk by color conversion processing circuit 58 and black component generating circuit 60.

Figure 5:
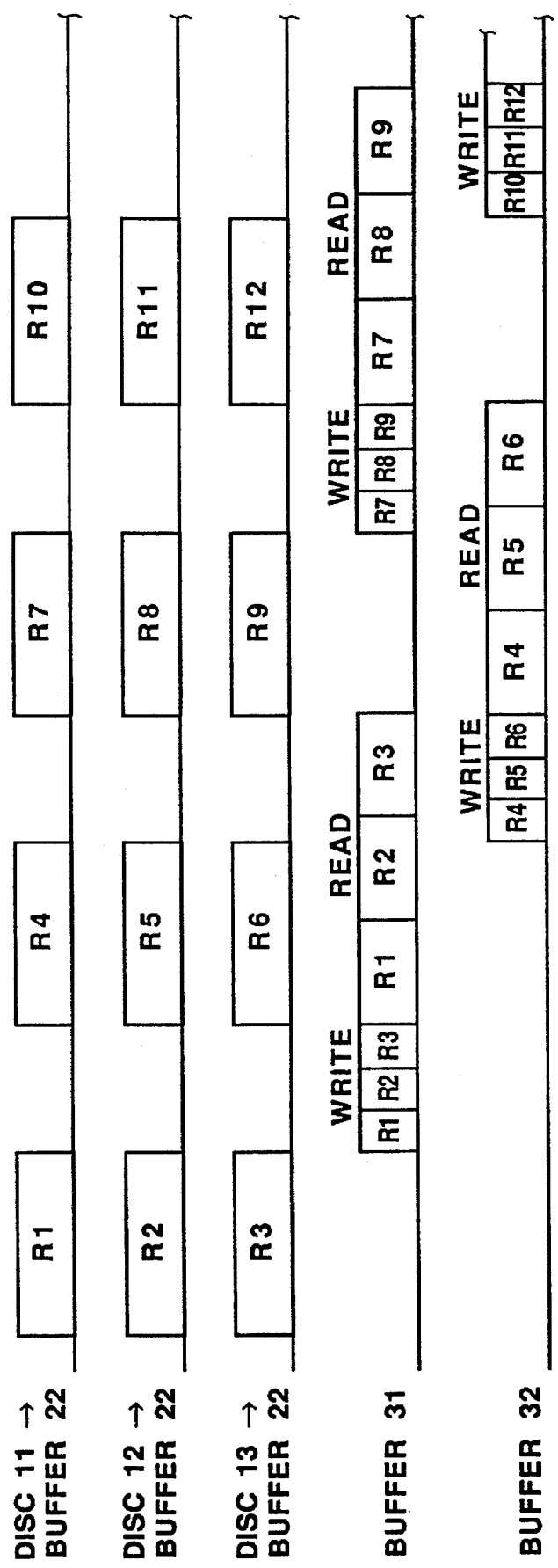
FIG. 5 is a timing chart of the reading/writing operation of a double buffer of the laser printer.

FIG. 5 illustrates the read/write timing in red component storage unit 1 and double buffer 16 controlled by switching control 5. Referring to FIG. 5, four lines of image data are stored in red component storage unit 1 so that one line image data is read by buffer 22 from discs 11 to 13 in one reading operation (data is read from discs 11 to 13 in parallel). The image data thus read out is transferred to double buffers 31 and 32 so as to be read out from the same. Assuming that storage units 2 and 3 are subjected to the similar process in parallel, any one of the color components of the signals Y, M, C or Bk is generated when the signals R, G and B are read out. That is, the signals R, G and B must be read out four times respectively in order to generate one line of image data of the signals Y, M, C or Bk.

Figure 6:
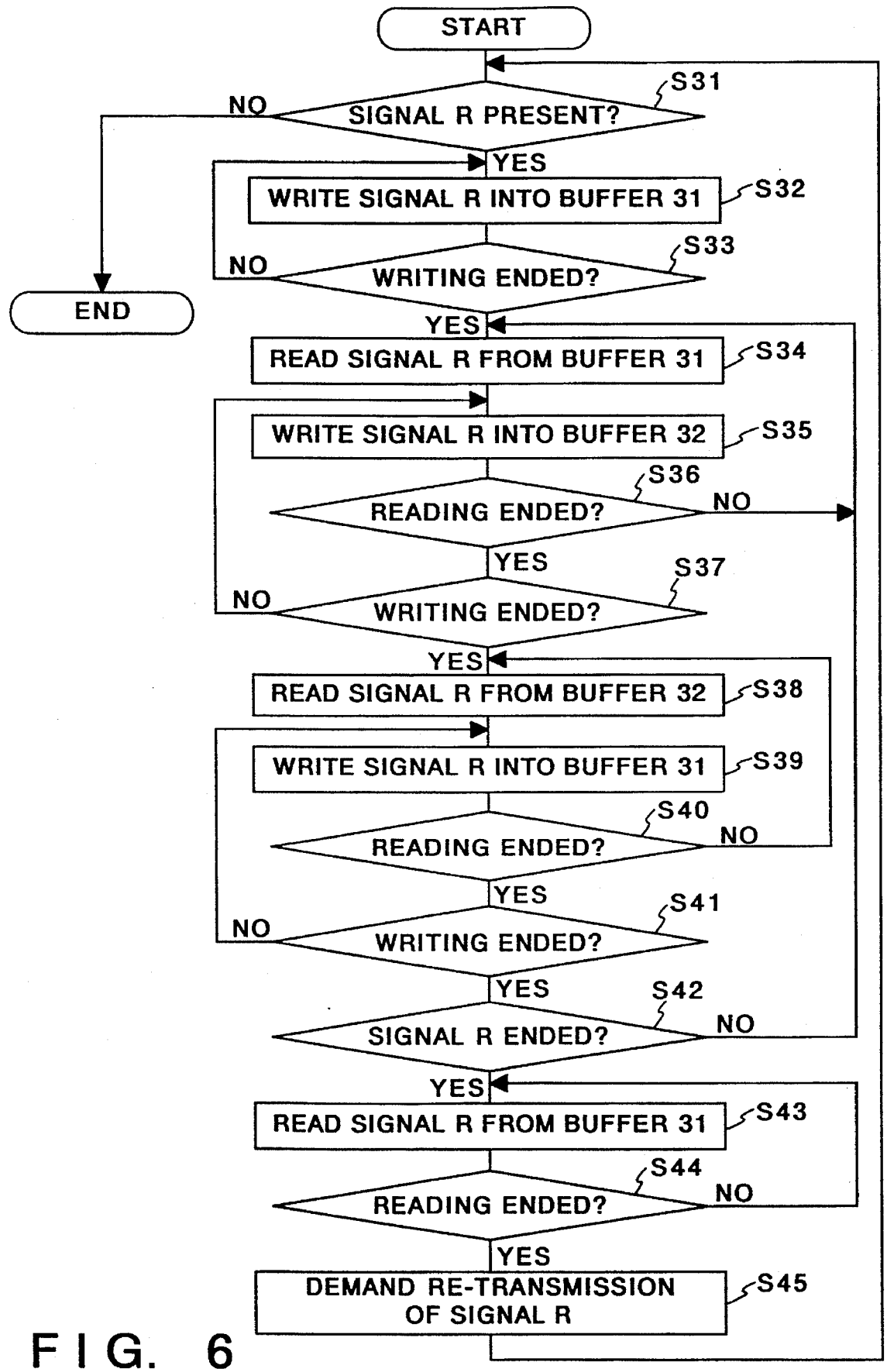
FIG. 6 is a flow chart showing the process performed in a switching control circuit of the laser printer.

The operation of reading out the signal R from red-component storage unit 1 will be described with reference to a timing chart shown in FIG. 5 and a flow chart showing a process performed by switching control circuit 5 shown in FIG. 6.

(1) In step S31, it is checked whether or not the signal R has been transmitted from storage unit 1. When the signals R (R1 to R3) for the first line are stored in buffer 22, the stored signals R are transmitted to double buffer 16. If it has been identified that the signals R have not been transmitted, the process is terminated here. If it has been identified that the signals R have been transmitted, the process proceeds to step S32.

(2) In step S32, writing of the signals R (R1 to R3) from storage unit 1 to buffer 31 of double buffer 16 is started. In next step S33, it is examined whether or not buffer 31 has been filled with the signals R. If it has been identified that buffer 31 has not been filled with the signals R yet, the process returns to step S32 in which writing of the signals R (for one line) and checking of buffer 31 are repeated until buffer 31 is filled with the signals R.

(3) In step S34, reading of the signals R (R1 to R3) written to buffer 31 is started.

(4) In step S35, writing of the signals R (R4 to R6) for the next line to buffer 32 is started.

(5) In steps S36 and S37, when reading of the signals R for one line from buffer 31 has been completed (step S36) and also writing of the signals R (R4 to R6) for the next line to buffer 32 has been completed (step S37), the process proceeds to step S38 in which reading of the signals R (R4 to R6) written to buffer 32 is started.

(6) In step S39, writing of the signals R (R7 to R9) for the next line to buffer 31 is started.

(7) In next steps S40 to S41, when reading of the line signals (R4 to R6) from the buffer 32 has been completed (step S40) and also writing of the line signals (R7 to R9) to buffer 31 has been completed (step S41), the process proceeds to step step S42. In step S42, it is checked whether or not the input of the signals R for one page has been completed. If it is identified that the input of the image data for one page has not been completed yet, the process returns to step S34 in which reading of the image data from buffer 31 is continued. If it is identified that the input of the image data for one page has been completed, the process proceeds to step S43.

(8) In steps S43 and S44, all of the signals R stored in buffer 31 are read out.

(9) When the output of the signals R for one page has been completed (at this time, the signals G and B have been transmitted simultaneously with the output of the signals R), one of the color components denoted by signals Y, M, C and Bk is generated. In step S45, a demand of reproduction of the signals R, G and B is made for the purpose of generating the next color component, and the process returns to step S31.

Subsequently, the residual color components of the Y, M, C and Bk signals are sequentially generated.

As described above, according to this embodiment, since image signals for one page are stored, image signals can be sequentially (dot sequentially, line sequentially or the like) transmitted/received at any desired timing. In general, a limit due to an output timing BD (Beam Detect) signal for the image signal is present in a case where an image is formed in accordance with an electro-photographic method using a laser beam. However, according to this embodiment, the host computer transmits the image signal asynchronously with the BD signal. Furthermore, the signals R, G and B are stored in a plurality of storage means (including discs) so as to be simultaneously read from them. Therefore, the access time can significantly be shortened. As a consequence, image forming can be performed precisely at a high speed.

Printer engine 57 in this embodiment comprises buffer 22, the double buffers 16, 26 and 36. However, a double buffer (capable of simultaneously receiving a plurality of data) corresponding to buffer 22 can be used to replace double buffers 16, 26 and 36. Furthermore, each of the above-described buffers may have a capacity capable of storing data for a plurality of Lines or a smaller capacity than that capable of storing data for one line.

[Second Embodiment]

According to the first embodiment, the signals R, G and B supplied from host computer 52 or printer controller 56 are respectively stored in storage units 1 to 3. The signals R, G and B thus stored are read from storage units 1 to 3 and color-converted so that an image is formed.

In this embodiment, each of predetermined data amount of signals R, G and B supplied from host computer 52 or printer controller 56 is stored in buffers 41 to 43 by switching over them and color-converted into signals Y, M, C and Bk. Subsequently, signals Y, M, C and Bk are stored in storage unit 51 under the control of storage control unit 4. The above-described data storage process is repeated so that all of data to be printed out are stored in the form of signals Y, M, C and Bk. After they have been stored, the signals Y, M, C and BK are sequentially transmitted from storage unit 51 by switching control circuit 5 so that an image is formed.

Figure 7:
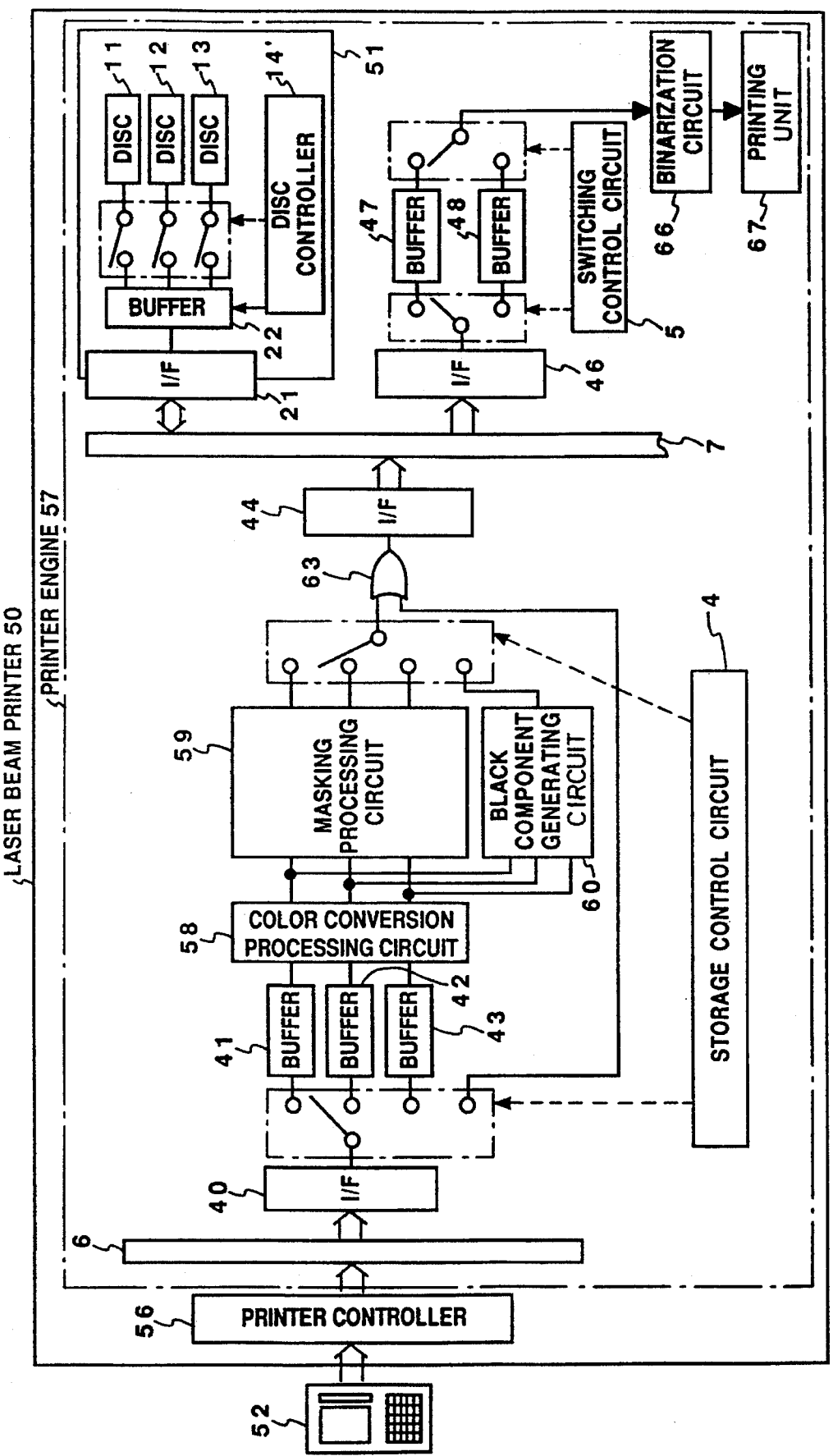
FIG. 7 is a block diagram illustrating a laser printer according to a second embodiment of the present invention.

FIG. 7 is a block diagram illustrating the structure of printer engine 57 of laser printer 50 according to a second embodiment of the present invention. Referring to FIG. 7, the same elements as those shown in FIG. 1 are given the same reference numerals and their descriptions are omitted here.

Figure 8:
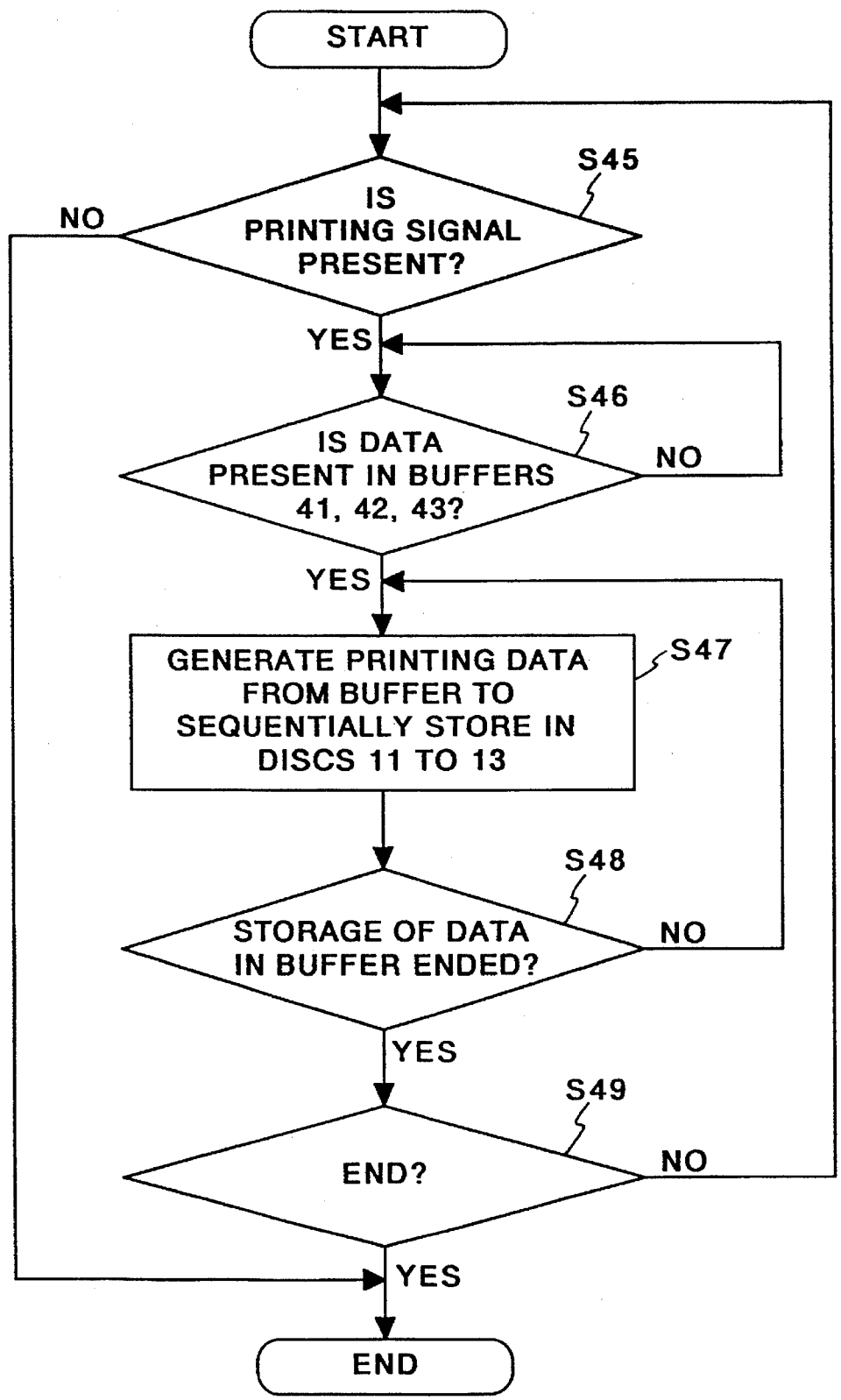
FIG. 8 is a flow chart showing the process performed by a storage Control circuit shown in FIG. 7.

The data storage process will now be described with reference to FIG. 8 which is a flow chart showing the operation performed by storage control circuit 4.

First, in step S45, it is examined whether or not a demand for a print signal exists in interface 40. If it has been identified that the demand exists, the process proceeds to step S46. If it is identified that no print signal exists on the other hand, the process is ended here. In step S46, it is checked whether or not a predetermined amount of data has been stored in buffers 41 to 43. After the predetermined amount of received data has been stored in buffers 41 to 43, the process proceeds to step S47.

In step S47, color conversion processing circuit 58 converts the signals R, G and B in the buffers 41 to 43 into the signals Y, M and C before the converted signals are subjected to the UCR process in masking processing circuit 59. Subsequently, a black generating circuit 60 generates the Bk (black) signal so as to be stored in discs 11 to 13 in storage unit 51 as described later. In step S48, it is examined whether or not the conversion of the signals R, G and B in buffers 41 to 43 and the storage of the signals Y, M, C and Bk have been completed. The processes of steps S47 to S48 are repeated until the conversion of the signals R, G and B and the storage of the signals Y, M, C and Bk are completed. In step S49, it is checked whether or not the conversion of the signals R, G and B and the storage of the signals Y, M, C and Bk for one page have been completed. If it is identified that the storage for one page has been completed, the process is ended here. If it is identified that the storage has not been completed, the process returns to stop S45 and the storage process is repeated until the storage for one page is completed.

Figure 10:
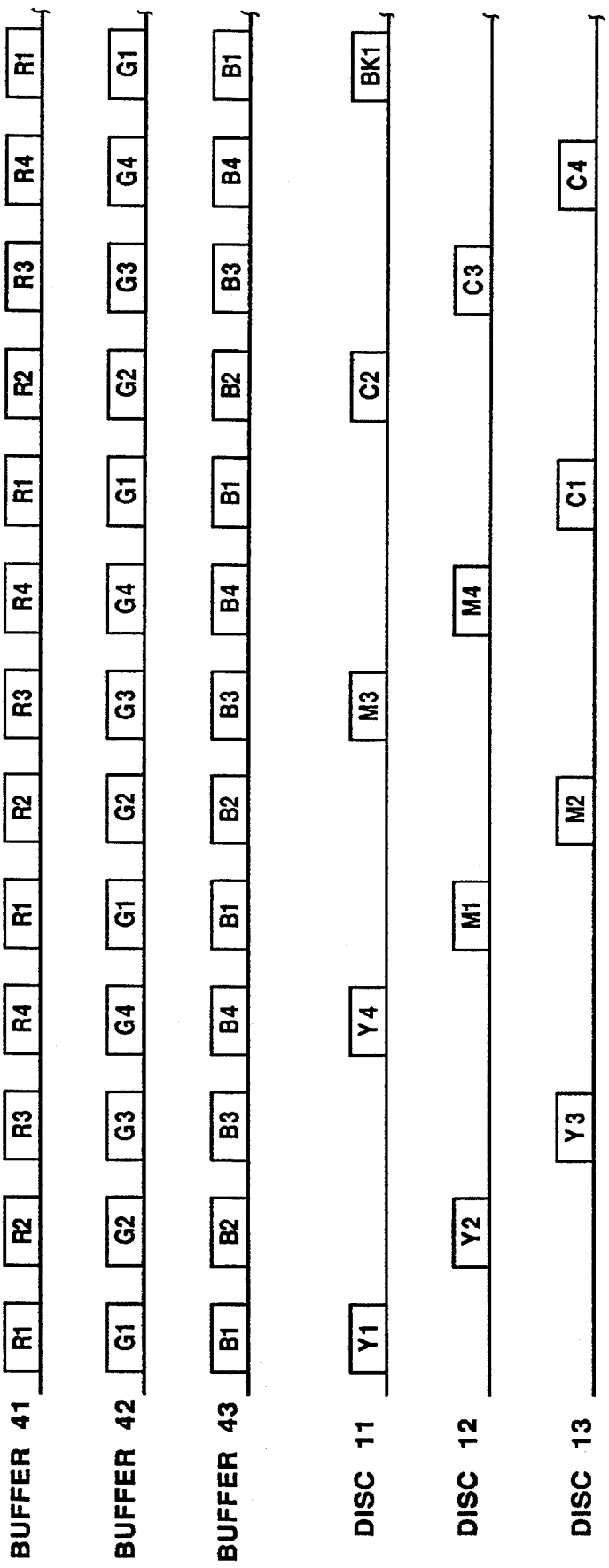
FIG. 10 is a timing chart for operations of writing data from buffers 41 to 43 to the discs 11 to 13 shown in FIG. 7.

FIG. 9 illustrates the storage areas of discs 11 to 13 in storage unit 51. FIG. 10 is a timing chart for writing operations of data from buffers 41 to 43 to discs 11 to 13.

In order to simplify the description, the operation will be described in which each of the color components (Y, M, C and Bk) of image information for one page is divided into four sections so as to be stored in discs 11 to 13.

When image information R1, G1 and B1 for the first quarter portion of one page are respectively transmitted from buffers 41, 42 and 43, signal Y1 is generated so as to be stored in disc 11. Signal Y2 which can be generated from image information R2, G2 and B2 for the next quarter portion of the page are stored in disc 12. Similarly, signal Y3 is stored in disc 13, and signal Y4 is stored in disc 11. Subsequently, signal M1 is generated from the signals R1, G1 and B1 so as to be stored in disc 12. When all of the signals Y, M, C and Bk are stored in storage unit 51, the signals Y, M, C and Bk are read from storage unit 51 by switching control circuit 5 so as to be sequentially transmitted to to binarization circuit 66. Thus, the process of the image forming operation is completed.

The operation of reading image information from storage unit 51 according to this embodiment will now be described with reference to a flow chart shown in FIG. 11.

First, it is checked whether or not data in storage unit 51 exists in step S51. If it is identified that no data exists, the process is ended here. If it is identified that data exists in storage unit 51, the process proceeds to step S52. In steps S52 and S53, the signals Y, M, C and Bk in discs 11 to 13 are sequentially written in buffers 47 and 48 until the buffers become full. In step S54, the signals in buffers 47 and 48 are sequentially read out. In step S55, it is examined whether or not the transmission of the image data has been completed. If it is identified that the transmission of the image data has been completed, the process is ended here. If it is identified that the transmission of the image data has not been completed yet, the process returns to step S51 in which reading of data from storage unit 51 is repeated until the transmission of all of image data is completed.

Figure 12:
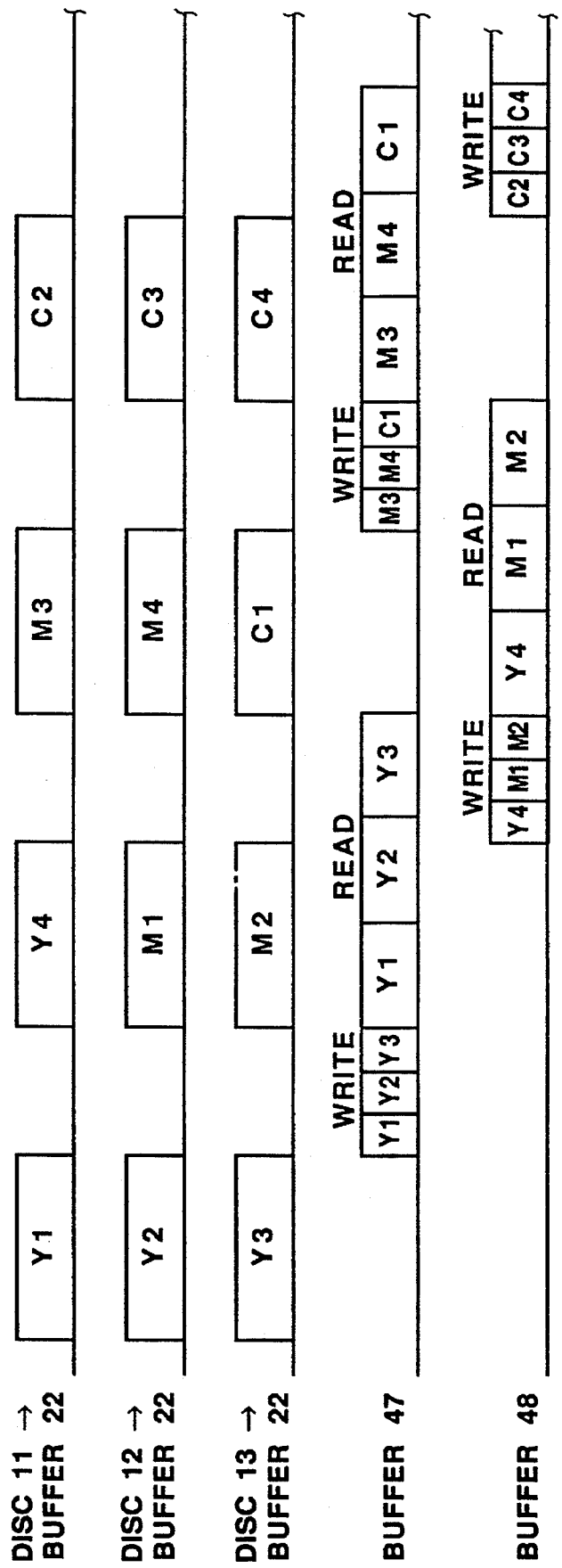
FIG. 12 is a timing chart for reading/writing operation in buffers 47 and 48 shown in FIG. 7.

FIG. 12 is a timing chart for reading/writing timing performed in discs 11 and 13 in storage unit 51 and buffers 47 and 48 under control of switching control circuit 5. Since the reading/writing timing is the same as that according to the first embodiment shown in FIG. 5, its description is omitted here.

As described above, according to this embodiment, the signals R, G and B, which are the input image signals, are color-converted into signals Y, M, C and Bk so as to be sequentially stored while controlling the storage areas of a plurality of discs. After this, the data are read simultaneously and in parallel from the plurality of discs so as to be sequentially transmitted. Therefore, in an image formation based on the signals R, G and B supplied from host computer 52 or printer controller 56 at any desired timing, it is not necessary for host computer 52 to transmit image information depending upon the image formation processing time in printer engine 57 even if a large amount of data to be transmitted in host computer 52 exists. Furthermore, the process throughput can significantly be improved although a hard disc device, whose access speed is slow, is employed.

[Third Embodiment]

A third embodiment of the present invention will now be described.

Figure 13A:
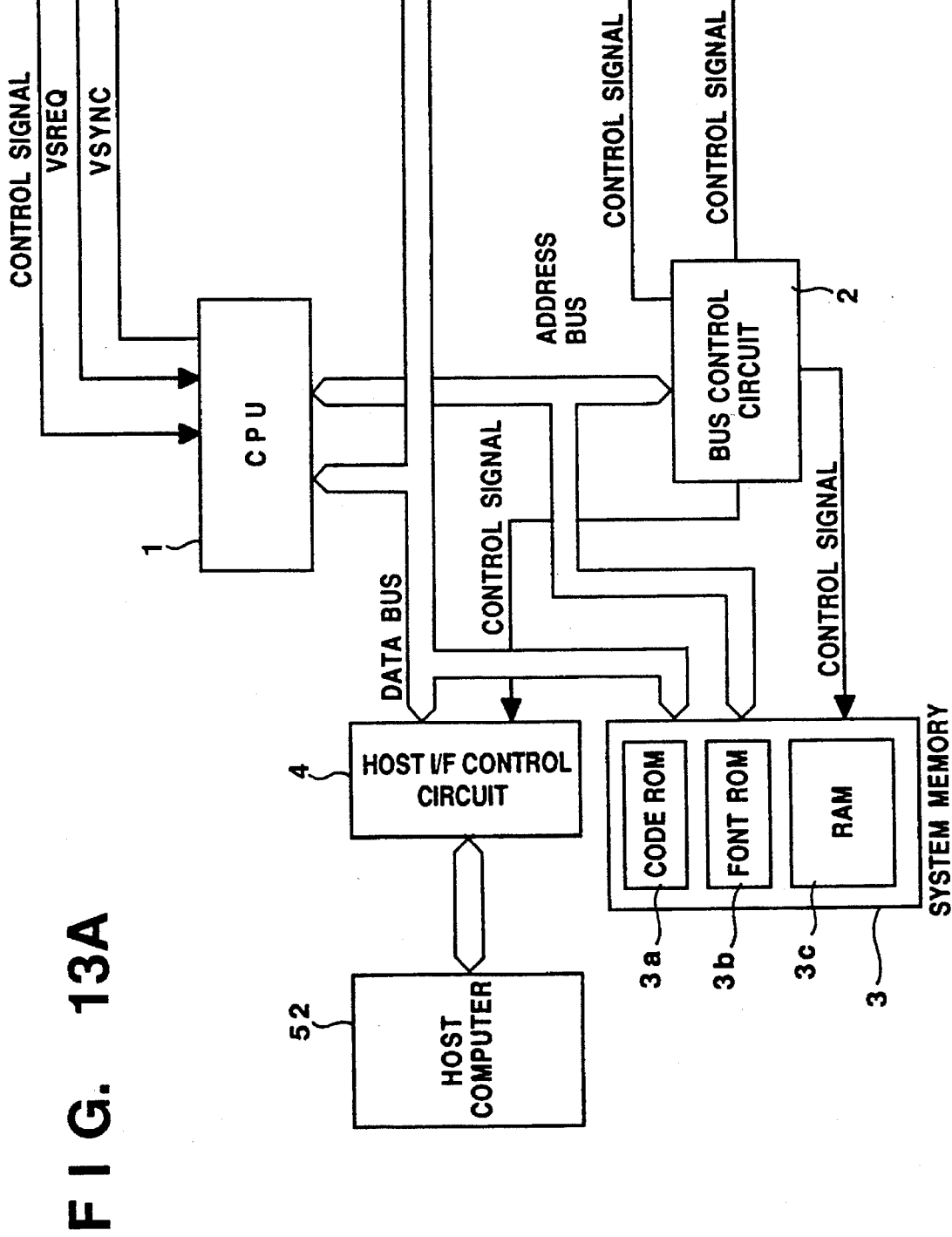
FIGS. 13A and 13B are block diagram illustrating a color printer according to a third embodiment of the present invention.
Figure 13B:
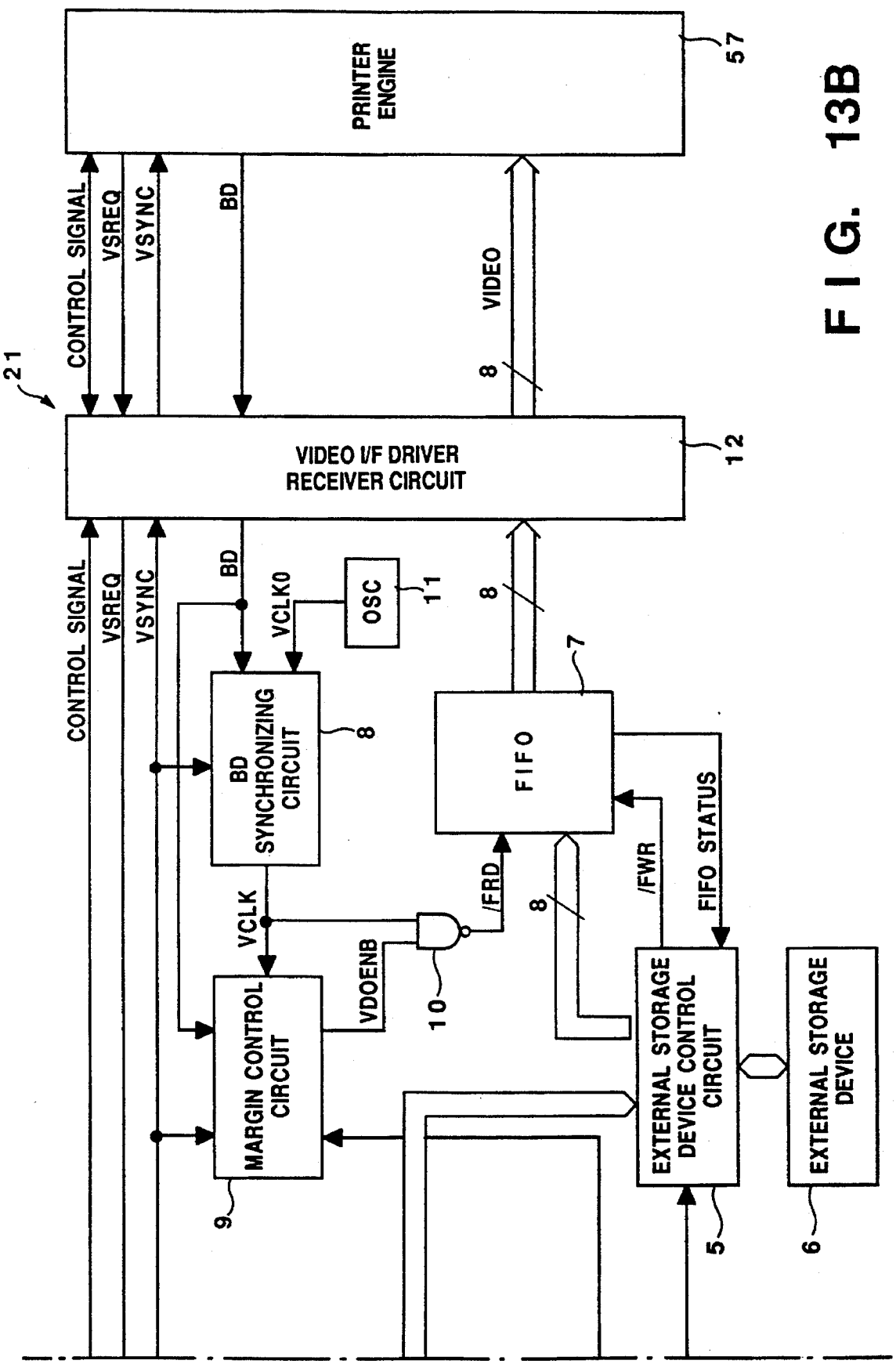

FIG. 13 which consists of FIGS. 13A and 13B, is a block diagram illustrating the structure of printer controller 21 according to a third embodiment of the present invention.

Referring to FIG. 13, reference numeral 1 represents a CPU for controlling the overall operation of image forming controller 21. The CPU receives printing data or a printing program transmitted from host computer 52 via I/F control circuit 4 so as to generate image data to be transmitted to printer engine 57. Furthermore, the CPU establishes a communication with printer engine 57 after the image data has been generated so that the printing operation is performed. According to this embodiment, image data is subjected to a process of converting into color components Y, M, C and Bk in printer controller 21. Furthermore, each of the color components data Y, M, C and Bk is transferred to printer engine 57.

Reference numeral 2 represents a bus control circuit for controlling the bus between CPU 1 and system memory 3, host I/F control circuit 4 or an external storage device control circuit 5. System memory 3 comprises a code ROM 3a for controlling the operation of CPU 1, a font ROM 3b for storing bit map fonts or outline fonts for the text code and a RAM 3c which is used by CPU 1 as a working area, which temporarily stores printing data transmitted from host computer 52 or which temporarily stores image data to be stored in an external storage unit 6.

Reference numeral 5 represents an external storage device control circuit for controlling transference of image data between CPU 1 or RAM 3c and external storage unit 6 during the period of a bit map image data generation based on printing data in CPU 1. Furthermore, external storage device 5 controls the transference of the bit map image data from external storage unit 6 to FIFO (First In First Out) buffer 7 after image data has been generated in external storage unit 6 and printing is thereby started. External storage unit 6 comprises a hard disc, a photoelectromagnetic disc or the like having a large storage capacity (several tens to hundreds of megabytes) in spite of a low cost, and it is allocated as a page memory which stores full color image data. In a case where a full color image is printed at a dot spatial resolution of 300 dpi (8 bits for each of color components Y, M, C and Bk), a page memory of about 32 megabytes is required if the paper size is A4 (296 mm×210 mm). Therefore, a 40-megabyte hard disc stores image data for one page, while an 80 megabyte hard disc stores image data for two pages.

On the other hand, hard discs and photoelectromagnetic discs are arranged to read/write data by moving head head in track units, one round of the disc being arranged to be one track. When continuous tracks are accessed, it takes 5 to 10 msec of access time in case of hard disc and 10 to 15 msec in case of photoelectromagnetic. However, both a hard disc and a photoelectromagnetic disc are able to transfer data within one track at a high speed of about 1.2 megabytes/sec which is faster than the image data transferring speed of 0.9 megabyte/sec (image clock frequency: 0.932 MHz) of a 300 dpi full color printer engine having a throughput of one sheet/minute.

FIFO 7 serves as an output buffer for temporarily storing image data to be transmitted to the full color printer engine. FIFO 7 acts to store image data read from external storage unit 6 in synchronization with/FWR signal which is a writing signal to FIFO 7. Furthermore, FIFO 7 sequentially reads image data in accordance with the storage sequence in response to a /FRD signal, which is a signal for causing data to be read from FIFO 7, and is in synchronization with an image clock VCLK transmitted from BD synchronizing circuit 9.

Figure 14:
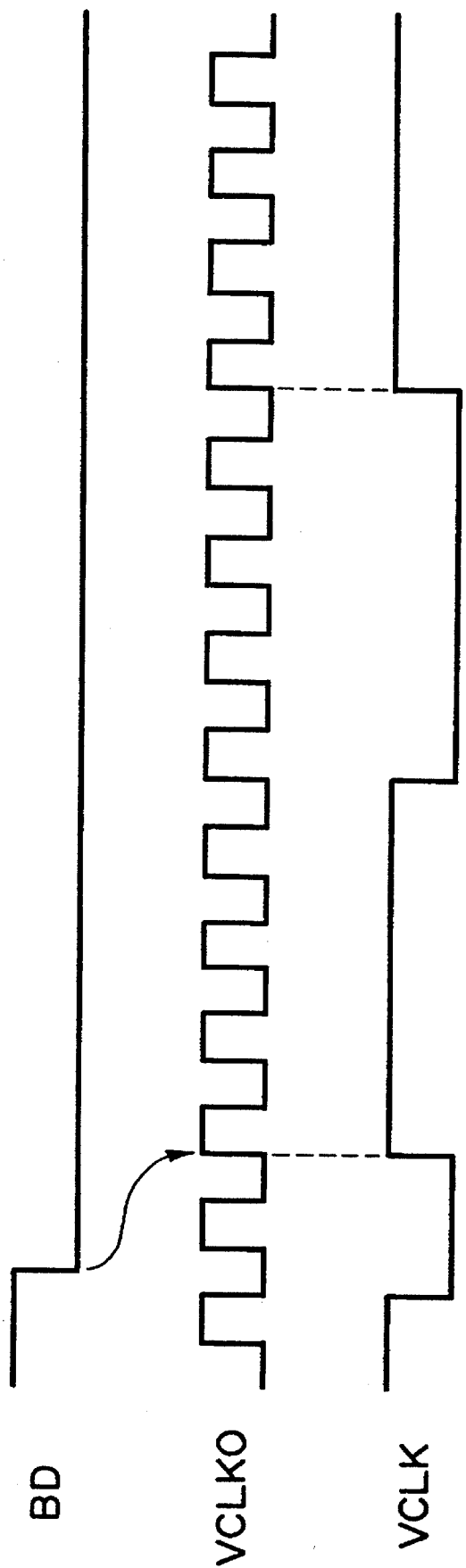
FIG. 14 is a timing chart of the operation of a BD synchronizing circuit.

Reference numeral 8 represents a BD (Beam Detection) synchronizing circuit which generates the image clock VCLK in synchronization with the BD signal which is a horizontal synchronizing signal transmitted from printer engine 7. In order to reduce the phase difference between the adjacent image clocks VCLK and the image clock VCLK to be one-eighth of the image clock VCLK, the frequency of clock signal VCLK0 transmitted from an OSC (crystal oscillator) 11 (see FIG. 14) is made to be 8 times as the frequency of the image clock VCLK so that a synchronization with the last transition edge of a BD signal is established.

Figure 15:
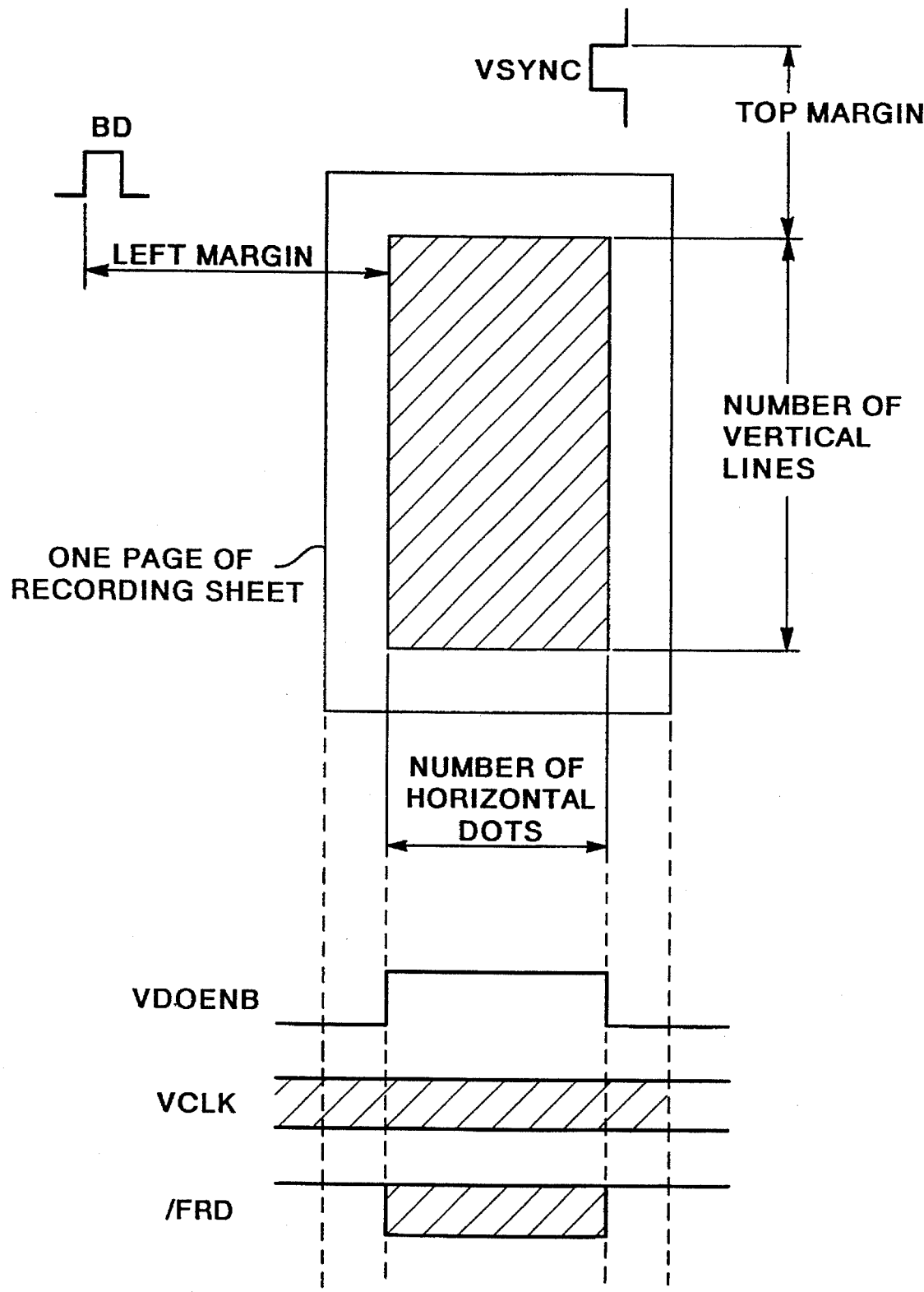
FIG. 15 a timing chart of VDOENB in a margin control circuit.

Reference numeral 9 represents a margin control circuit for setting an effective region (hatched area of FIG. 15) for an image data to be printed in one page as shown in FIG. 15. The vertical directional region is set in a manner such that the top margin and the number of the printing lines in the vertical direction are counted in response to the BD signal after vertical synchronizing signal (VSYNC) has been received. The horizontal directional region is set in a manner such that the left margin and the number of dots to be horizontally printed are counted in accordance with the image clock VCLK after the BD signal has been received. In the effective region for the image data expressed by the hatched area of FIG. 15, a VDOENB (Video Enable) command is issued so as to generate a read signal/FRD for reading data from FIFO 7, in a NAND gate 10 in connection with VCLK transmitted from BD synchronizing circuit 8. Reference numeral 12 represents a video I/F driver/receiver circuit comprising a circuit for controlling the input and output of the communication established between image forming controller 21 and printer engine 57.

Figure 16A:
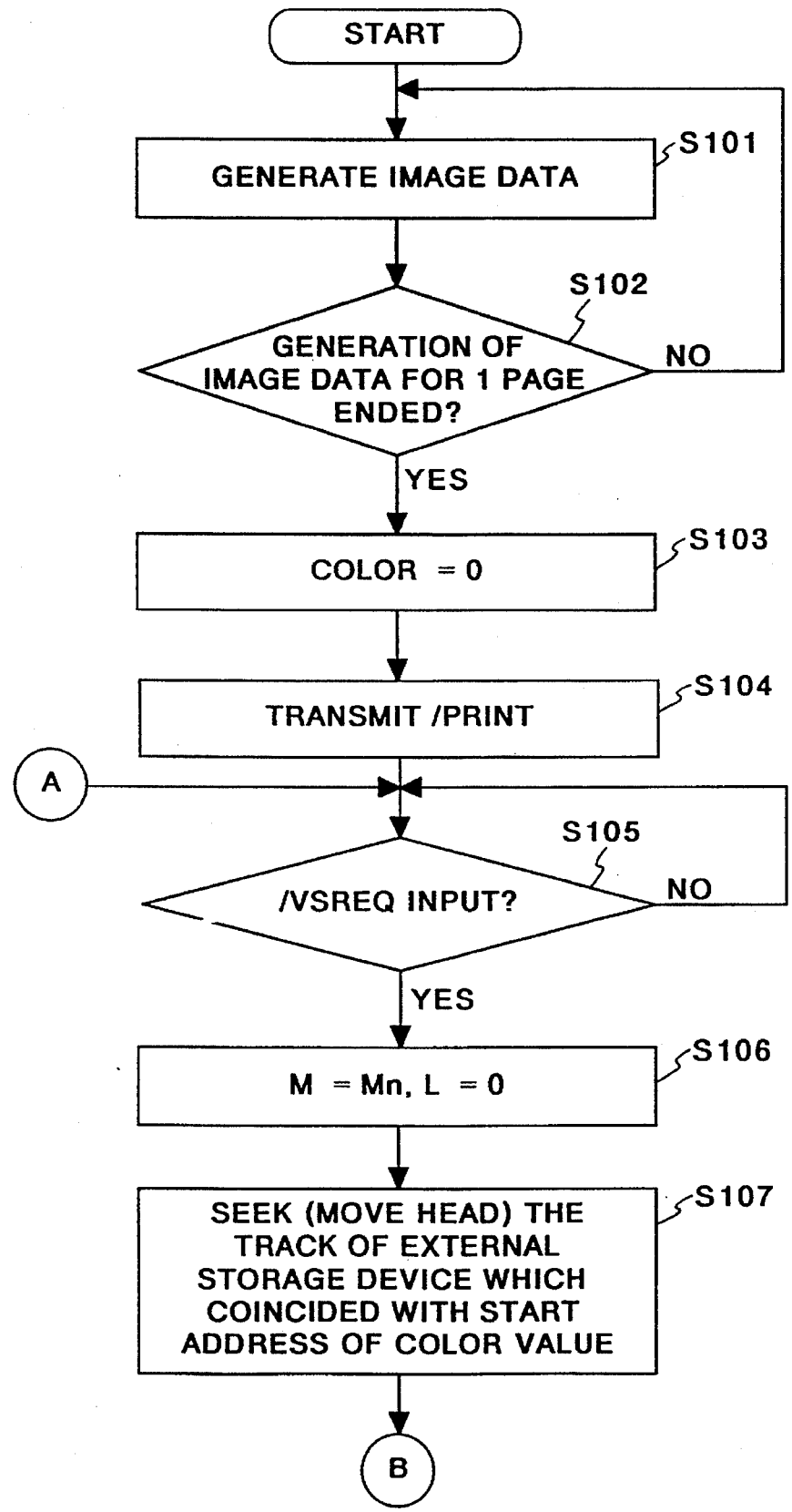
FIGS. 16A, 16B and 16C are flow charts showing a process of transferring image data from an external storage device to an FIFO buffer.
Figure 16B:
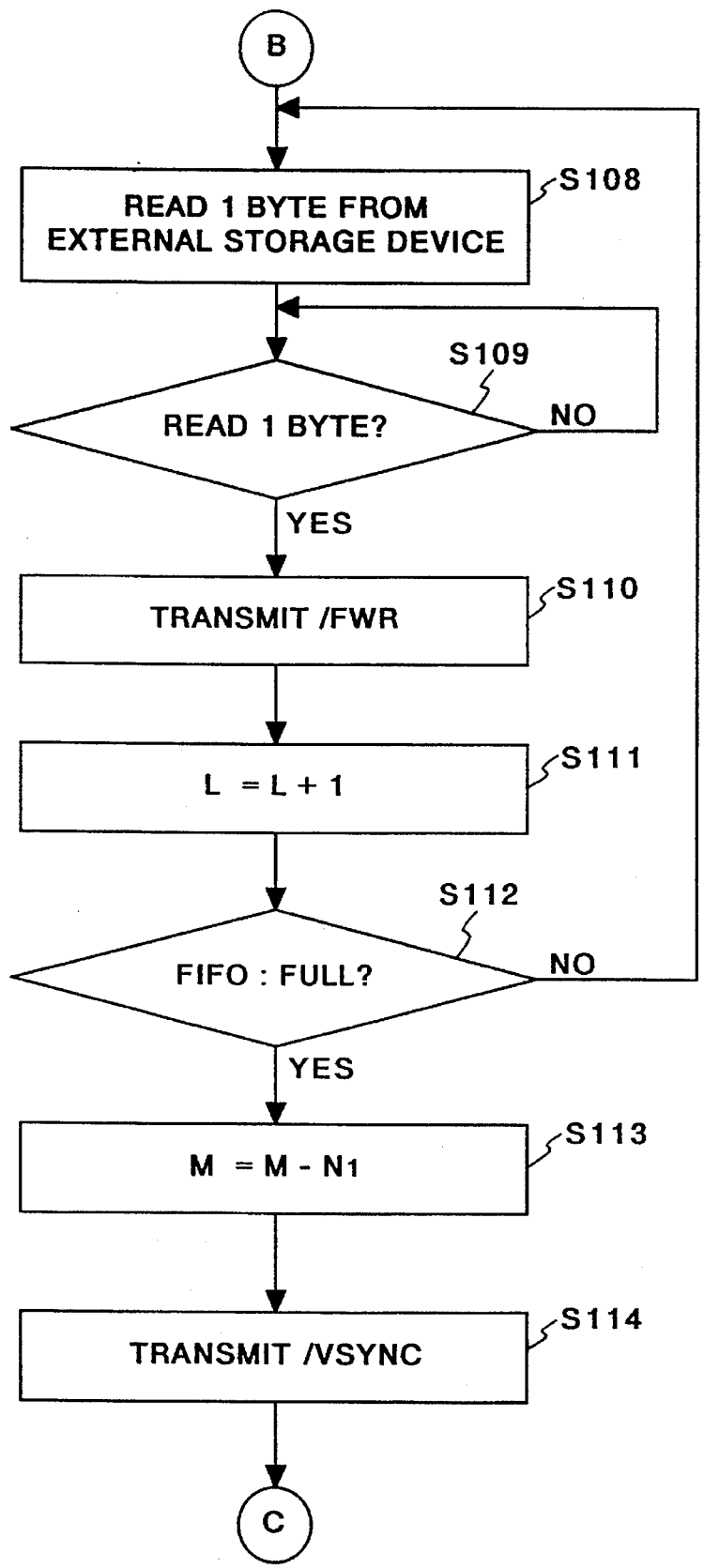
Figure 16C:
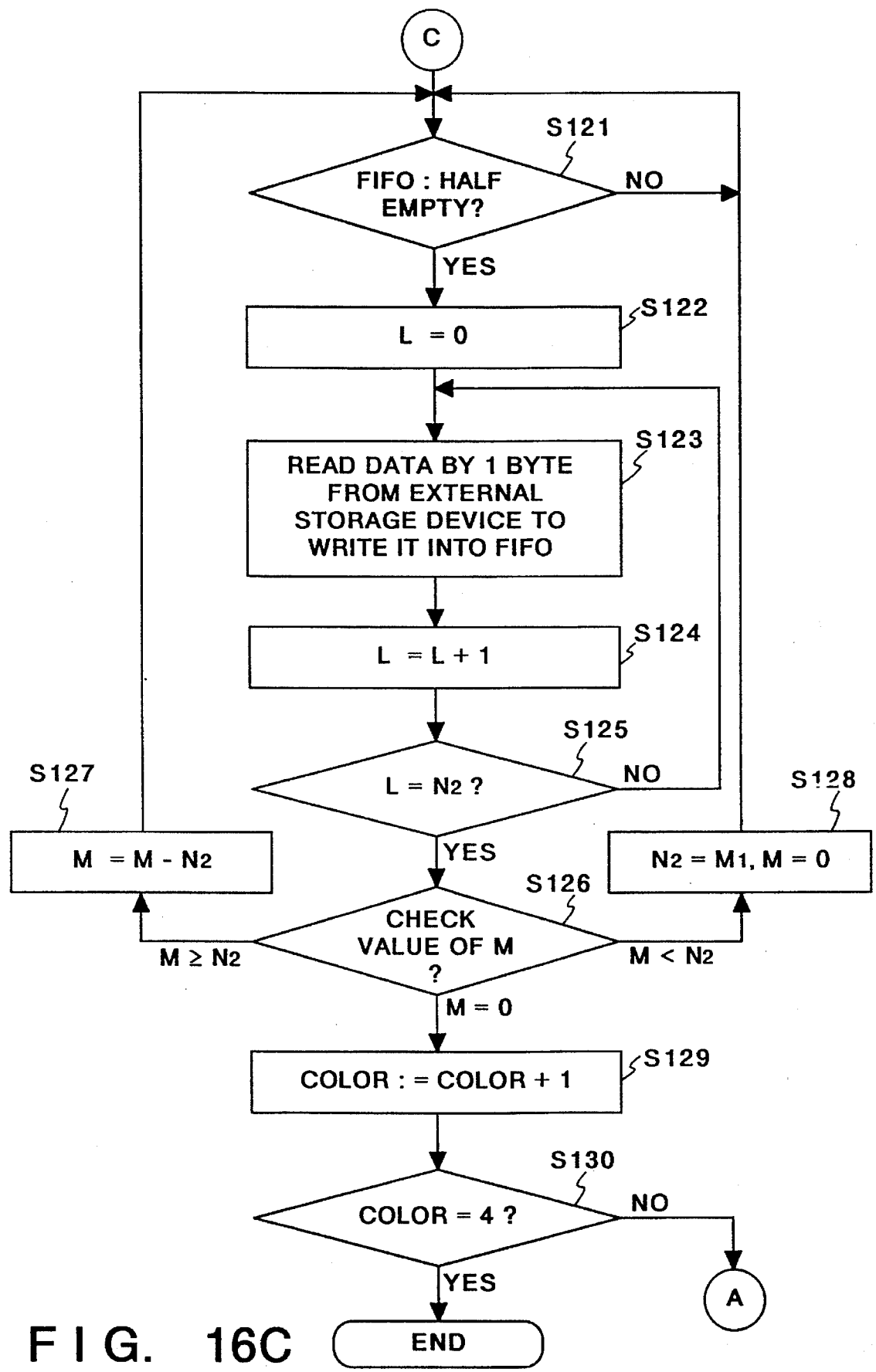

The processes of printing out the bit map image data performed by printer engine 57 after the bit map image data for one page has been generated by printer controller 21 will be described with reference to a flow chart of FIG. 16 showing the operation sequence of external storage unit 7 which controls the transference of the bit map image data from external storage unit 6 to FIFO 7.

All of the above-described processes are performed in accordance with various commands issued from CPU 1.

Figure 17:
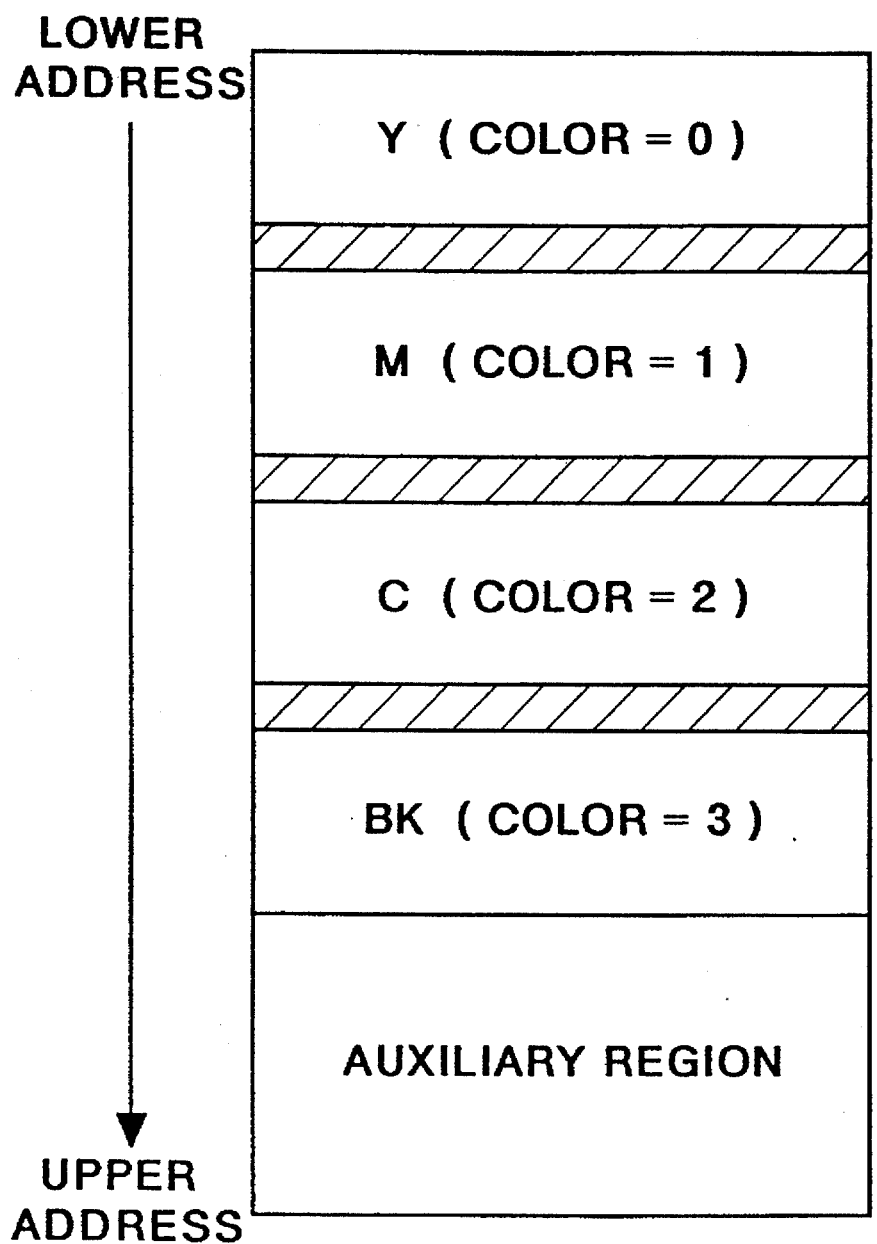
FIG. 17 illustrates a memory map in which image data of each of the color components is stored.

In steps S101 and S102, CPU 1 generates the image data for one page to be transmitted to printer engine 57. In next step S103, the color component to be first transmitted among the various color components (Y, M, C and Bk) stored in external storage unit 6 is, as color =0, transmitted to external storage unit control circuit 5. In this embodiment, yellow corresponds to color =0. The storage of the color components into external storage unit 6 is controlled by CPU 1 in a manner such that the address space of external storage unit 6 is assumed the virtual memory space as shown in FIG. 17 and the color components Y, M, C and Bk are sequentially assigned from the lower address to the upper address.

Figure 18:
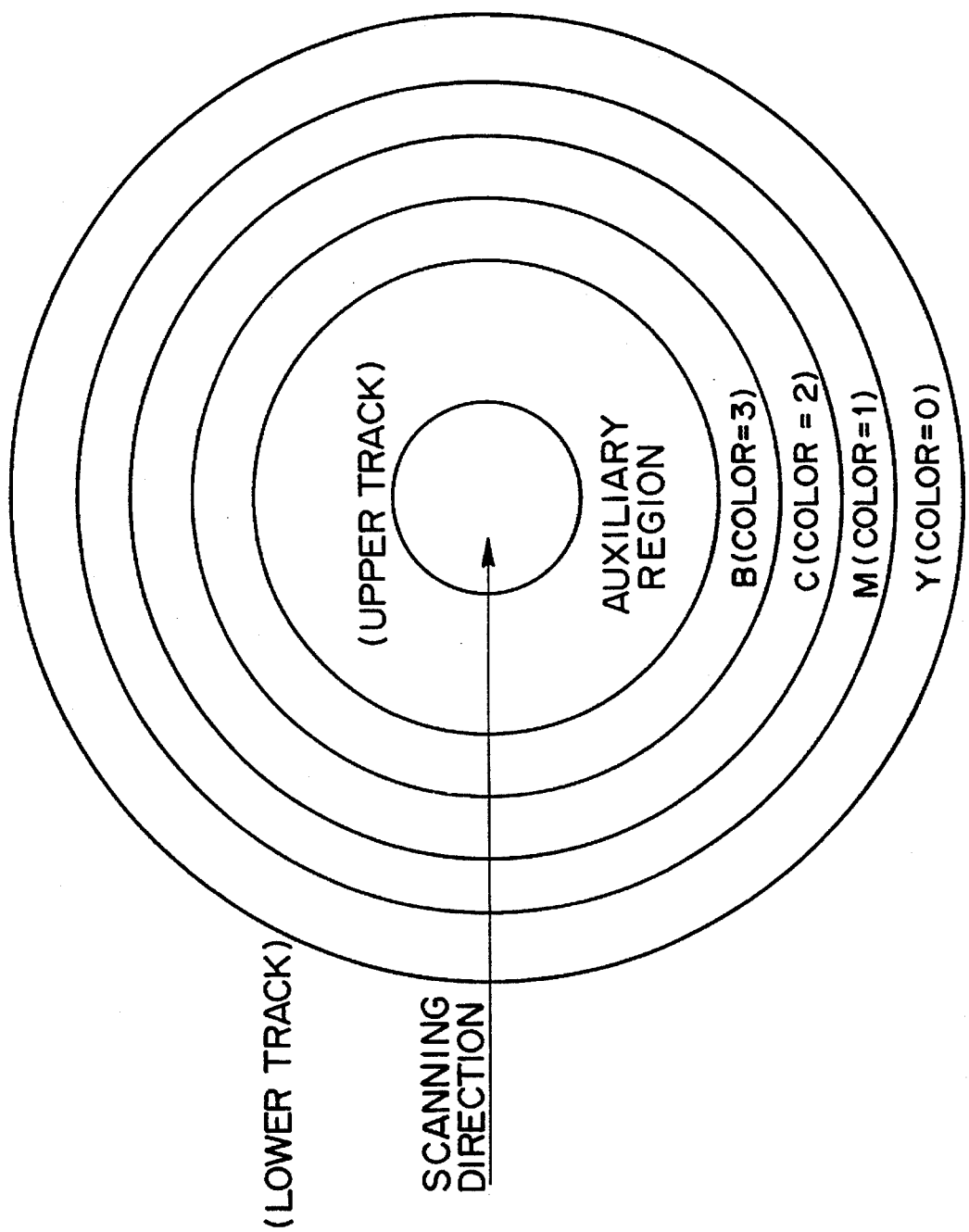
FIG. 18 illustrates the storage region in an external storage device in which image data of each of the color components is stored.

Each value of color =0 to 3 (integer) is a state variable in external storage unit control circuit 5 which corresponds to each of the color components. Since printer engine 57 forms the image in an forming order Y→M→C→Bk, the state variables are arranged in such a manner such that color =1 is M (magenta), color =2 is C (cyan) and color =3 is Bk (black). FIG. 18 is a map illustrating each of the color components to be stored in external storage unit 6 (hard disc). Color components are stored in the storing order Y, M, C and Bk from the lower track to the upper track so as to correspond to the map of the virtual memory space of CPU 1 shown in FIG. 17. Since one track is able to store data of about 8K to 20K bytes and one line for each color component of image data having a 8 bits width is about 2.3K bytes, one track stores image data for 3.3 to 8.3 lines if the size of recording paper is A4 and the dot density is 300 dpi.

In step S104, CPU 1 transmits a print signal/PRINT to printer engine 57. In next step S105, CPU 1 waits until a vertical synchronization request signal/VSREQ to be transmitted from printer engine 57 comes. When the vertical synchronization request signal/VSREQ is supplied, CPU 1 commands external storage unit control circuit 5 to transfer bit map image data to FIFO 7. In step S106, external storage unit control circuit 5 loads the data size (recording paper: A4, dot density: 300 dpi and about 8 megabytes in a case where each of dots is 8-bit multi-value data) Mn into a page counter in response to the transference command issued from CPU 1. Furthermore, a data transferring counter L is reset to be zero.

In step S107, the track head of external storage unit 6 seeks (the head is moved) the starting address of the value of the color. In steps S108 and S109, a one byte of bit map image data in the same track in external storage unit 6 is read so as to be verified. In step S110, writing signal/FWR is transmitted so as to write the read data to FIFO 7. In step S111, the data transferring counter L is advanced by one. Thus, image data for one byte is stored in FIFO 7. In step S112, it is examined whether or not the buffer of FIFO 7 has been filled with the image data. If the buffer is not filled with the image data, the process returns to step S108 in which data is stored until the buffer is filled with the image data. If the buffer memory is filled with $N_1$ bytes of image data, the process proceeds to step S113 after issuing a status signal of FIFO:full.

In step S113, when external storage unit control circuit 5 receives the status signal denoting a fact that FIFO is full, it reduces the count of the page counter by N1. In step S114, CPU 1 transmits a vertical synchronizing signal/VSYNC. When the/VSYNC signal is transmitted, the image clock VCLK transmitted from BD synchronizing circuit 8 shown in FIG. 14 and VDOENB transmitted from margin control circuit 9 shown in FIG. 15 are supplied to NAND gate 10 so that FIFO reading signal (/FRD) is generated, and image data written to FIFO 7 is read so as to be transmitted to printer engine 57.

In a case where image data is continuously read from FIFO 7 in response to the signal/FRD, the image data is subsequently transferred from external storage unit 6 to FIFO 7 in response to a status signal transmitted from FIFO 7. External storage unit control circuit 5 performs the following operations from step S121.

In step S121, it is checked whether or not the data amount left in FIFO 7 has been reduced to the half of its full amount due to reading of data from FIFO 7 in response to the signal/FRD. The data reading is continued until the data amount in FIFO 7 is reduced to the half of its full amount. When the residual amount of data in FIFO 7 is halved, a signal of FIFO:half empty (a signal transmitted when the data amount in FIFO is reduced to half of the buffer size) is transmitted, then the process proceeds to step S122.

In step S122, the data transferring counter L is reset 5 before data is transferred by one byte from external storage unit 6 to FIFO 7 in step S123. In step S124, the data transferring counter L is advances by one count. In step S125, it is checked whether or not the count of the data transferring counter L has become $N_2$ bytes. If it is identified that the count of data transferring counter L has not become $N_2$, the process returns to step S123. In step S123, the data transferring is continued. If it is identified that the data transferring counter L has reached $N_2$ bytes, the process proceeds to step S126.

The value of $N_2$ bytes is determined depending upon the data transferring speed on the same track in external storage unit 6, the speed of transferring image data to the printer engine and the seeking time between tracks so that the amount of the bit map image data present in the FIFO can be larger than the half of the size of the buffer in the FIFO. For example, assuming that the data transferring speed in the same track is 1.2 megabytes/sec, the speed of transferring the image data to the printer engine is 0.9 megabyte/sec, the seeking time between tracks is 10 msec and the size of the buffer memory in FIFO 7 is 32K bytes, when data is transferred until the data fills a three quarters of the buffer memory (24K bytes), the time period of transferring data by a amount of $N_2$ bytes can be expressed by the following equation:

$$\text{data amount in } FIFO = (\text{present data amount in } FIFO) - \quad (1)$$
$$(\text{data transferring speed to printer engine}) \times$$
$$(\text{data transferring time } (T)) +$$
$$(\text{data transferring speed to } FIFO) \times$$
$$(\text{data transferring time } (T))$$

Substituting the above-described values into (1), the following equation can be obtained:

$$24 \times 1024 = 16 \times 1024 - 0.9 \times 1024^2 \times \quad (2)$$
$$(1 + 0.01n) \times T + 1.2 \times 1024^2 \times$$
$$(1 - 0.01n) \times T$$

Thus, the following result can be obtained:

$$T = 8/(307.2 - 21.5n)(\text{sec}) \quad (3)$$

Assuming that track seeking operation must be performed two times (n =2) here, the transferring time (T) is 0.03 seconds, and the number ($N_2$) of bytes to be transferred is about 37K bytes (=1.2×1024×1024×0.03 / 1024).

In step S126, the count (M) of the page counter is checked. In a case where M≧$N_2$, the process proceeds to step S127 in which the count (M) is reduced by $N_2$ before the process returns to S121. In a case where M<$N_2$, the process proceeds to step S128 in which the count (M) is set to 0 and the count ($N_2$) of the data transferring counter is set to M before the process returns to step S121. In a case where M=0 (it is identified that the image data for one page for each color component has been read out from external storage unit 6), the process proceeds to step S129.

In step S129, external storage unit control circuit 5 advances the value of "color" by one before the process proceeds to step S130 in which it is checked whether or not the value of color is 4. If the value of "color" is any one of 1 to 3, the process returns to step S105 in which the bit map image data for the color components which has not been transmitted to printer engine 57 yet is read from external storage unit 6 so as to be written to FIFO 7 and transmitted to printer engine 57. If "color"=4, the process is ended here.

According to this embodiment, when the residual amount of data in the buffer is reduced to the half of the buffer memory size during the period of reading of the data from the FIFO buffer, data is written to the FIFO buffer. Therefore, the FIFO buffer does not become empty and data can be continuously read out from it.

[Fourth Embodiment]

The third embodiment is-arranged in a manner such that a printer controller has one FIFO buffer with respect of one external storage unit. A printer controller according to this embodiment is arranged in a manner such that its external storage unit control circuit has two external storage units and two FIFO buffers.

Figure 19A:
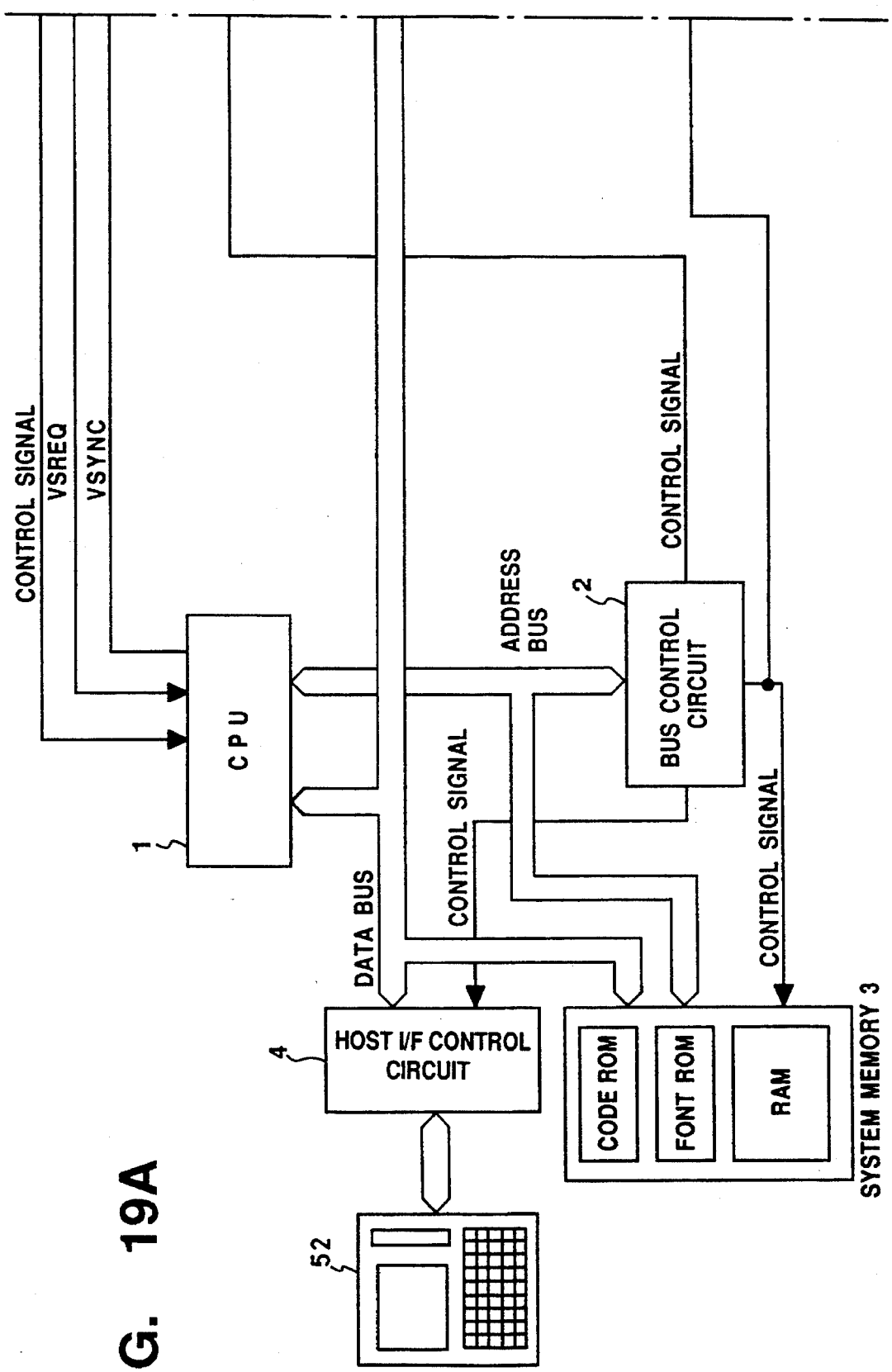
FIG. 19A and 19B are block diagram illustrating a color printer according to a fourth embodiment of the present invention.
Figure 19B:
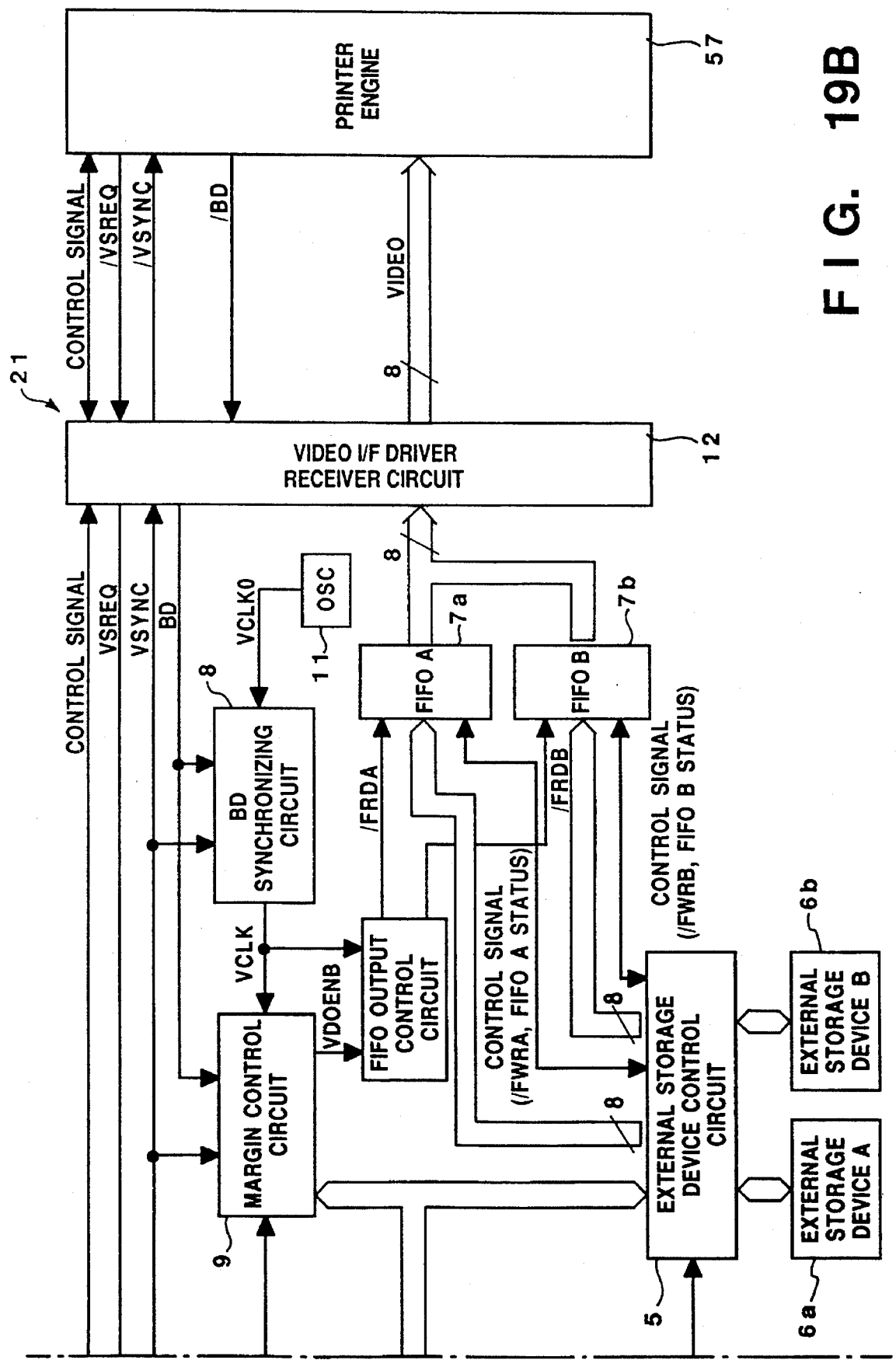

FIG. 19 consisting of FIGS. 19A and 19B, is a block diagram illustrating the structure of the printer controller of the color printer apparatus according to a fourth embodiment of the present invention. 20 The printer controller according to this embodiment has two external storage units 6a and 6b serving as image memories and two FIFOs 7a and 7b which correspond to the two external storage units 6a and 6b. Thus, the image data transferring speed between the external storage unit and the FIFO can be increased twice. The same elements as those of the printer controller according to the third embodiment are given the same reference numerals and their descriptions are omitted here.

Referring to FIG. 19, external storage control circuit 5 controls image data to be read from FIFOs 7a and 7b at the time of the printing process so as to be transmitted to the printer engine in a manner such that even line image data is transferred from external storage unit 6a to the FIFO 7a and odd line image data is transferred from external storage unit 6b to FIFO 7b. Therefore, when CPU 1 generates image data, the image data are divided into data for the even lines and data for the odd lines so as to be stored in corresponding external storage units 6a and 6b.

Figure 20:
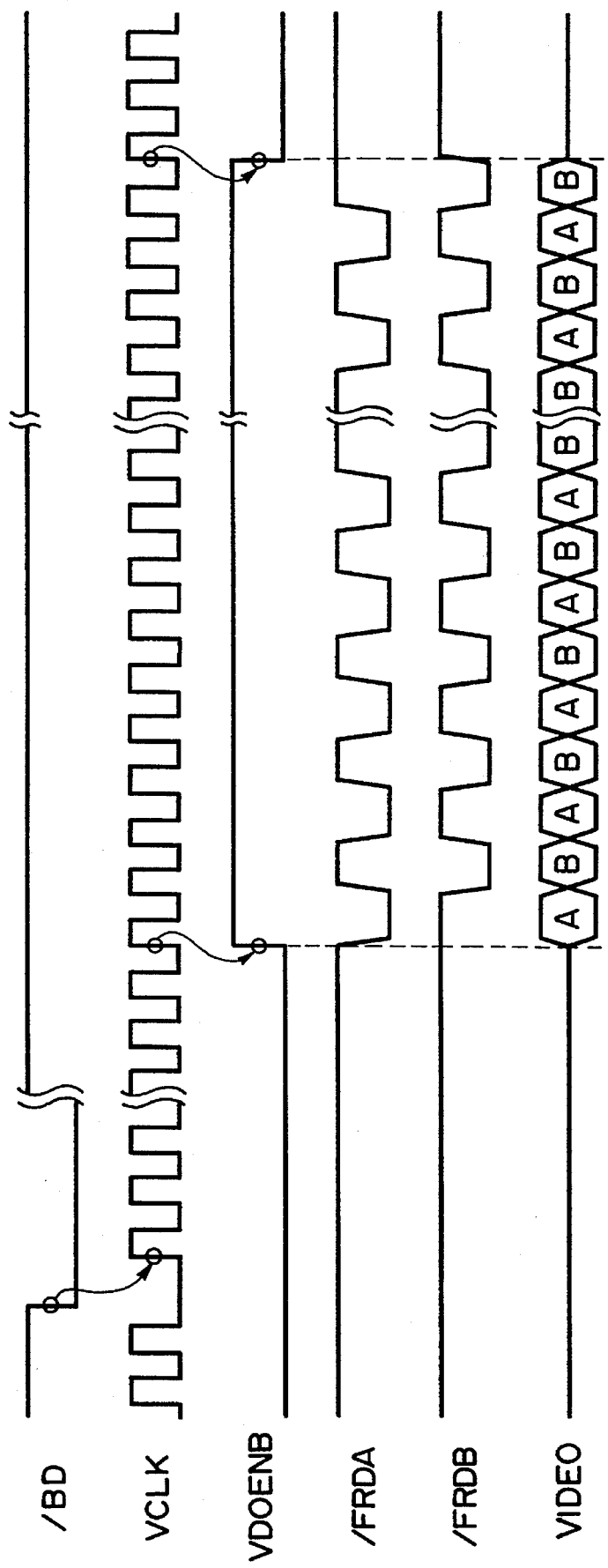
FIG. 20 is a timing chart of transmitting image data according to the fourth embodiment.
Figure 21:
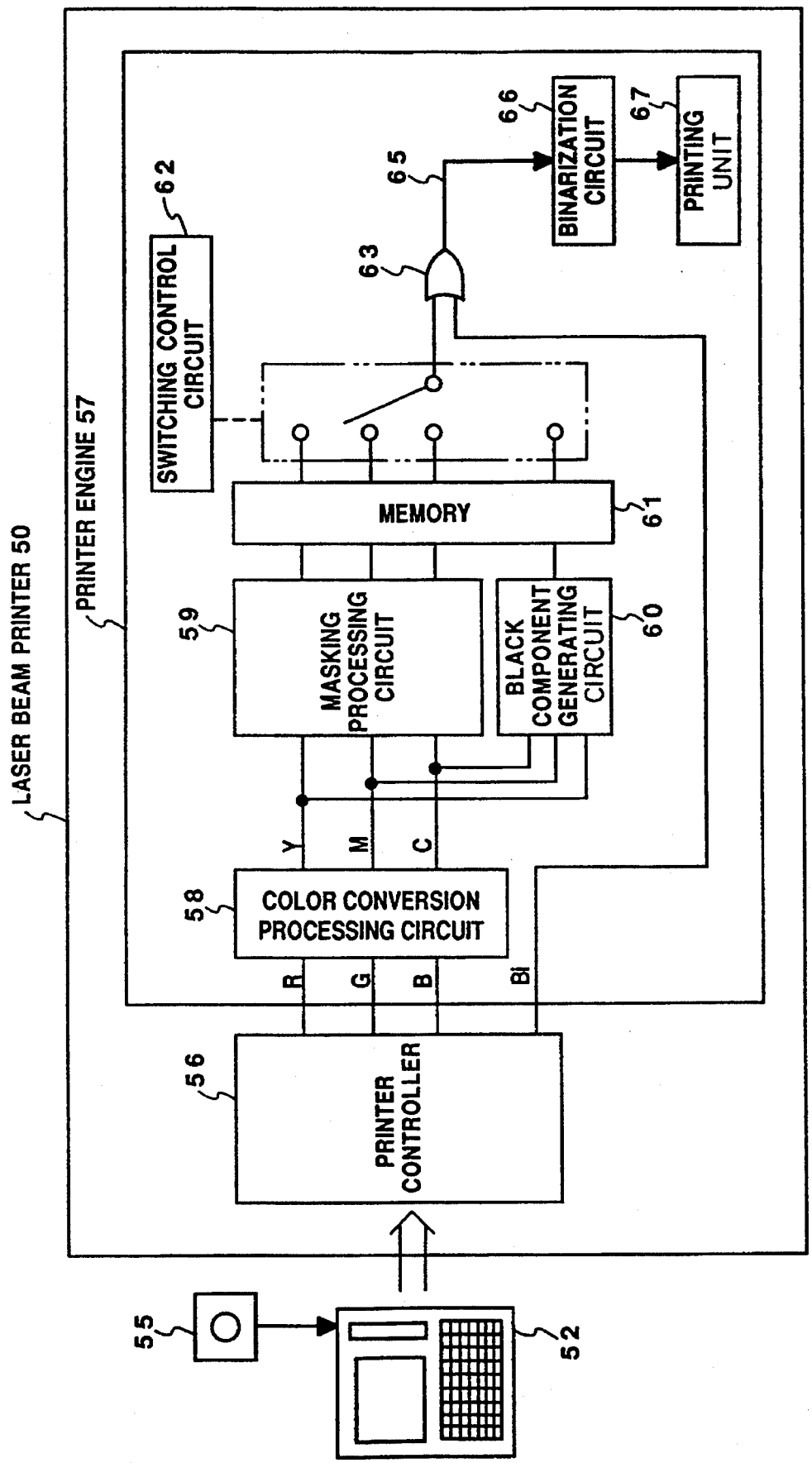
FIGS. 21 and 22 illustrate a conventional example.
Figure 22:
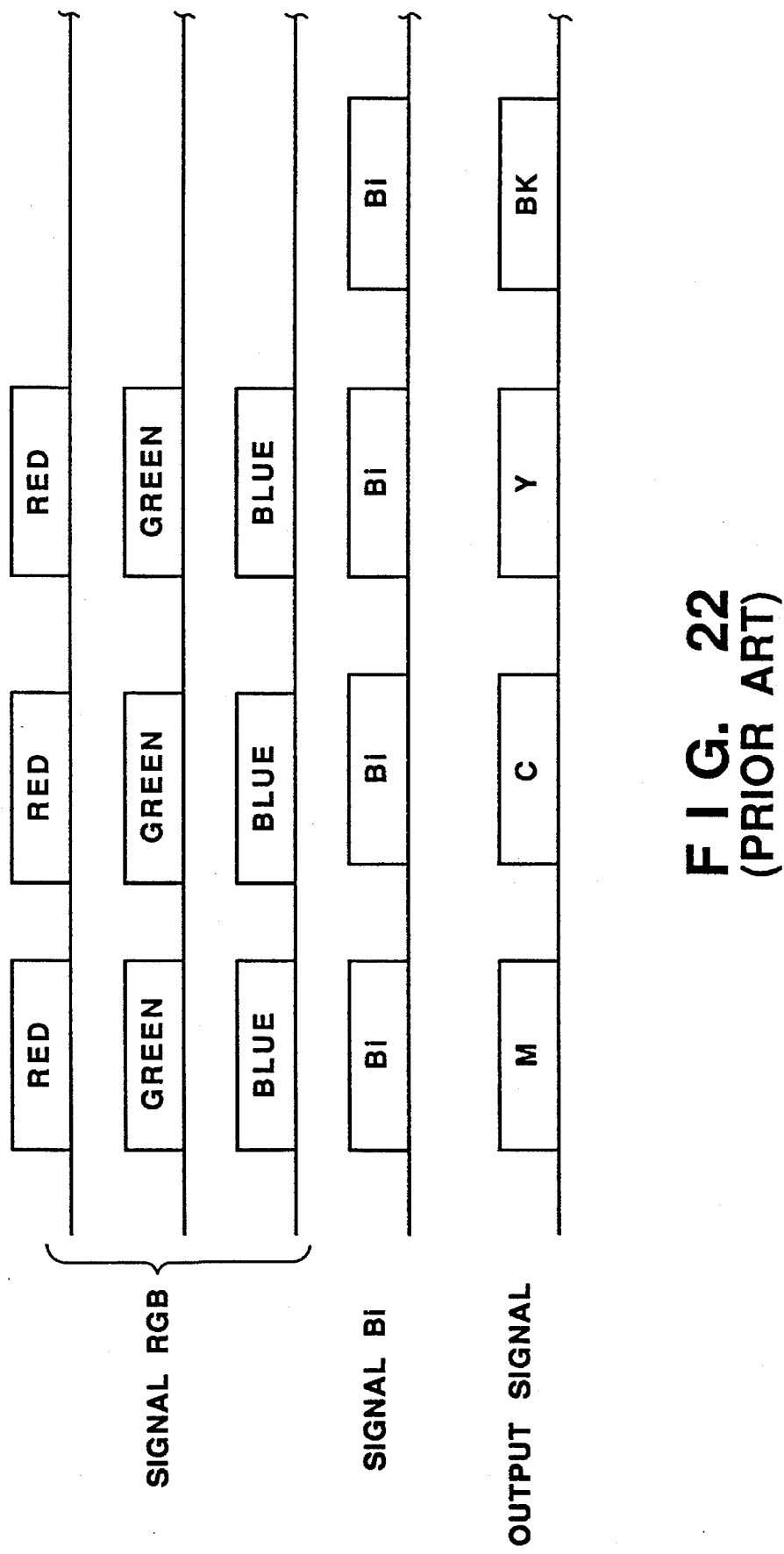

Reference numeral 13 represents an FIFO output control circuit which issues signals/FRDA and/FRDB for alternately accessing FIFOs 7a and 7b so as to control reading of the data from FIFO 7a storing image data for even lines and FIFO 7b storing image data for odd lines. As shown in the timing chart shown in FIG. 20, FIFO output control circuit 13 generates the signals/FRDA and/FRDB for alternately reading out from FIFOs 7a and 7b in accordance with the image clock VCLK transmitted from BD synchronizing circuit 8 and VDOENB transmitted from margin control circuit 9. Consequently, the image data is alternately read in a manner such that even lines image data is read from FIFO 7a when the signal/FRDA is in low level and odd lines image data is read from FIFO 7b when the signal/FRDB is in low level.

The thus constituted printer controller is arranged to act at the printing operation in a manner such that image data is asynchronously transferred from external storage unit 6a to FIFO 7a and also is transferred from external storage unit 6b to FIFO 7b in response to the status signals respectively transmitted from FIFOs 7a and 7b. As a consequence, the data transferring speed can be improved twice that realized in the third embodiment. Therefore, the printer controller according to this embodiment can be used in a full color printer engine capable of printing out two sheets per minute. Since the sequence of transferring the image data from external storage unit 6a or 6b to FIFO 7a or 7b is the same as the sequence shown in the flow chart according to the third embodiment shown in FIG. 16, the description about it is omitted here.

Although the printer controller according to this embodiment has two external storage units and the two corresponding FIFOs, it may have three pairs or more. In this case, a satisfactory effect can be obtained if it is employed in a high speed color printer in which image data is transferred at an extremely high speed.

Furthermore, the FIFO disposed between the external storage unit and the printer engine so as to serve as the buffer means may be replaced by a memory such as an SRAM. In this case, a peripheral circuit must be added to the structure so as to control the above-described memory, causing a similar sequence to that performed by the FIFO according to the third and fourth embodiments to be performed.

Although the description in these embodiments is concentrated on the color printer, the present invention may, of course, be applied to a multi-value printer capable of expressing a gray scale or a binary, white and black, printer.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus for receiving code data supplied from an external apparatus, generating dotted image data based on the code data, and outputting the dotted image data, comprising:

image data generating means for generating dotted image data for each color component based on the code data;

storage means for storing the dotted image data for one page;

buffering means capable of buffering one scan line of the dotted image data read from said storage means;

write means for writing the dotted image data to said buffering means;

read means for reading the dotted image data from said buffering means in synchronization with a synchronizing signal sent from an image forming unit; and output means for transmitting the dotted image data to the image forming unit synchronously with said synchronizing signal.

2. The apparatus according to claim 1, wherein said storage means comprises a hard disc and each color component of said dotted image data is stored in a continuous region of said hard disc.

3. The apparatus according to claim 2, wherein the color components are, respectively, Y (yellow), M (magenta), C (cyan) and Bk (black).

4. The apparatus according to claim 1, further comprising a CPU, wherein said CPU comprises a virtual memory addressable CPU and the dotted image data is handled in a region of a virtual space continuously addressed.

5. The apparatus according to claim 1, further comprising supervisory means for supervising reading of the dotted image data from said buffering means, wherein the writing of the dotted image data to said buffering means is controlled in accordance with a quantity of the dotted image data read from said buffering means.

6. The apparatus according to claim 1, further comprising an image forming unit which forms an image in accordance with an electrophotographic process.

7. The apparatus according to claim 1, further including an image forming unit.

8. An image processing apparatus for receiving code data supplied from an external apparatus, generating image data based on the code data and outputting the image data, comprising:

image data generating means for generating dotted image data based on the code data;

a plurality of storage means for storing the dotted image data for one page;

a plurality of buffering means for buffering the dotted image data read from said plurality of storage means;

read means for reading the dotted image data from said plurality of storage means in parallel so as to transmit the dotted image data to said plurality of buffering means; and output means for transmitting the dotted image data read from said plurality of buffering means to image forming means synchronously with a synchronizing signal from said image forming means.

9. The apparatus according to claim 8, wherein said plurality of storage means are disposed to correspond to said plurality of buffering means.

10. The apparatus according to claim 8, wherein said control means reads the dotted image data by successively switching over said plurality of buffering means in response to said synchronizing signal so as to transmit the dotted image data to said image forming means.

11. The apparatus according to claim 10, further comprising a plurality of supervisory means for supervising reading of the dotted image data from said plurality of buffering means, wherein the writing of the dotted image data to said buffering means is controlled in accordance with a quantity of the dotted image data read from said buffering means.

12. The apparatus according to claim 8, wherein said plurality of storage means comprise hard disks.

13. The apparatus according to claim 8, further comprising image forming means which forms an image in accordance with an electrophotographic process.

14. An image processing method for receiving code data supplied from an external apparatus, generating a color image signal based on the code data and outputting the color image signal, comprising the steps of:

generating the color image signal based on the code data;

storing the generated color image signal for one page in storage means;

writing the color image signal stored in said storage means into a buffer capable of storing one scan line of the color image signal and reading the the color image signal from buffer synchronously with an image forming operation for an image formation.

15. The apparatus according to claim 8, further including an image forming means.

16. The apparatus according to claim 15, wherein said image forming means electrophotographically forms an image.

17. The method according to claim 14, wherein said storage means comprises a hard disc and each color component of the color image signal is stored in a continuous region of said hard disc.

18. The method according to claim 17, wherein the color components are respectively Y (yellow), M (magenta), C (cyan) and Bk (black).

19. The method according to claim 14, wherein the color image signal is handled in a continuously addressed region of a virtual space.

20. The method according to claim 14, further comprising the step of supervising reading of the color image signal from the buffer, wherein the writing of the color image signal to the buffer is controlled in accordance with a quantity of the color image signal read from the buffer.

21. The method according to claim 14, further comprising the step of forming an image in accordance with the color image signal, using an electrophotographic process.

22. A color image processing apparatus comprising:

input means for inputting image information including non-dot information;

converting means for converting the input image information into dot information for each color component;

first memory means for storing the converted dot information;

buffering means for buffering the dot information read from said first memory means; and reading means for reading out one scan line of the dot information in said buffering means, and outputting to image forming means in synchronization with a synchronizing signal from the image forming means.

23. The apparatus according to claim 22, wherein said converting means includes second memory means for storing a bitmap or outline font corresponding to a text code.

24. The apparatus according to claim 22, wherein said buffering means includes one of a SRAM and FIFO memory.

25. The apparatus according to claim 22, wherein said reading means includes clock signal generation means for generating a clock signal in synchronization with the synchronization signal from said image forming means, and said reading means reads out the dot information buffered by said buffering means in synchronization with the clock signal generated by said clock signal generation means.

26. The apparatus according to claim 22, wherein said buffering means includes a plurality of memories which are alternately used for write-in and read-out.

27. The apparatus according to claim 26, wherein said first memory means includes a plurality of storage units, which respectively correspond to each of said plurality of memories.

28. The apparatus according to claim 22, wherein said first memory stores one page of the dot information for each color components.

29. The apparatus according to claim 22, further comprising said image forming means.

30. The apparatus according to claim 29, wherein said image forming means frame-sequentially forms an image for each color components.

31. The apparatus according to claim 29, wherein said image forming means frame-sequentially forms an image for each color components representing Y, M, C and Bk.

* * * * *

UNITED STATES PATENT AND TRADEMARK OFFICE
CERTIFICATE OF CORRECTION

PATENT NO. : 5,596,426

DATED : January 21, 1997

INVENTOR(S): Fumihiro Ueno, et al.  Page 1 of 4

It is certified that error appears in the above-identified patent and that said Letters Patent is hereby corrected as shown below:

Title page, item
[56] REFERENCES CITED

```
U.S. Patent Documents, insert
   --4,860,119  8/1989   Maniwa et al.
     4,941,108  7/1990   Aoyagi et al.
     4,963,898  10/1990  Kadowaki et al.
     4,516,139  5/1985   Takiguchi--.
Foreign Patent Documents, insert
   --0122430   10/1984  European Patent Off.
     3339966   5/1984   Germany
     63274550  11/1988  Japan
     1184137   7/1989   Japan
     1184138   7/1989   Japan
     1184140   7/1989   Japan
     1184141   7/1989   Japan
     1269543   10/1989  Japan
     2050852   2/1990   Japan--.
```

COLUMN 1

Line 65, "through" should read --through by--.

COLUMN 2

Line 15, "by" should read --by a--.

UNITED STATES PATENT AND TRADEMARK OFFICE
CERTIFICATE OF CORRECTION

PATENT NO. : 5,596,426

DATED : January 21, 1997

INVENTOR(S) : Fumihiro Ueno, et al.

It is certified that error appears in the above-identified patent and that said Letters Patent is hereby corrected as shown below:

COLUMN 3

Line 13, "bytes),it" should read --bytes), it--.
    Line 15, "seek" should read --"seek"--.
    Line 18, "been" should be deleted and "megabyte/sec."
        should read --megabytes/sec.--.
    Line 20, "a" (second occurrence) should read --an--.

COLUMN 3

Line 4, "byte, second" should read --bytes/second--.
    Line 65, "FIG. 2" should read --FIG.2,-- and "(c)"--.
        should read -- (c), --.

COLUMN 6

Line 12, "Control" should read --control--.
    Line 14, "FIG. 9" should read --FIG. 9,--.
    Line 22, "diagram" should read --diagrams--.
    Line 41, "diagram" should read --diagrams--.

COLUMN 8

Line 23, "that" should be deleted.

COLUMN 10

Line 15, "step" (second occurrence) should be deleted.
    Line 58, "Lines" should read --lines--.

UNITED STATES PATENT AND TRADEMARK OFFICE
CERTIFICATE OF CORRECTION

PATENT NO.  : 5,596,426

DATED       : January 21, 1997

INVENTOR(S) : Fumihiro Ueno, et al.

It is certified that error appears in the above-identified patent and that said Letters Patent is hereby corrected as shown below:

COLUMN 11

Line 66, "to" (second occurrence) should be deleted.

COLUMN 12

Line 42, "FIG. 13" should read --FIG. 13,--.

COLUMN 13

Line 22, "head" should read --the--.
   Line 25, "in" should read --in the--.
   Line 26, "in" should read --in the--.

COLUMN 15

Line 36, "advances" should read --advanced--.

COLUMN 16

Line 46, "FIG. 19" should read --FIG. 19,--.
   Line 49, "20" should be deleted.

COLUMN 17

Line 1, "an" should read --a--.

UNITED STATES PATENT AND TRADEMARK OFFICE
CERTIFICATE OF CORRECTION

PATENT NO. : 5,596,426

DATED : January 21, 1997

INVENTOR(S): Fumihiro Ueno, et al.

It is certified that error appears in the above-identified patent and that said Letters Patent is hereby corrected as shown below:

COLUMN 19

Line 8, close up right margin

COLUMN 20

Line 30, "components." should read --component.--.
   Line 35, "components." should read --component.--.
   Line 38, "components" should read --component--.

Signed and Sealed this

Twenty-first Day of October 1997

Attest:

BRUCE LEHMAN

*Attesting Officer*     *Commissioner of Patents and Trademarks*